United States Patent [19]
Widrow

[11] Patent Number: 4,964,087
[45] Date of Patent: Oct. 16, 1990

[54] SEISMIC PROCESSING AND IMAGING WITH A DRILL-BIT SOURCE

[75] Inventor: Bernard Widrow, Stanford, Calif.

[73] Assignee: Western Atlas International, Houston, Tex.

[21] Appl. No.: 292,552

[22] Filed: Mar. 13, 1989

Related U.S. Application Data

[62] Division of Ser. No. 939,359, Dec. 8, 1986, Pat. No. 4,849,945.

[51] Int. Cl.[5] .............................................. G01J 1/00
[52] U.S. Cl. ...................................... 367/45; 367/40; 364/421; 364/422; 364/148
[58] Field of Search ...................... 367/28, 39, 40, 45, 367/86; 382/42; 364/421, 422, 806, 819, 21, 148; 324/369

[56] References Cited

U.S. PATENT DOCUMENTS

| | | | |
|---|---|---|---|
| 4,243,935 | 1/1981 | McCool et al. | 324/77 R |
| 4,355,368 | 10/1982 | Ziedler et al. | 364/728 |
| 4,849,945 | 7/1989 | Widrow | 367/41 |
| 4,866,680 | 9/1989 | Scherbatskoy | 367/43 |

OTHER PUBLICATIONS

K. Waters, "Reflection Seismology"; 1981 Book Publ., John Wiley & Sons, Inc., Tn 269W37, pp. 124–128.
Widrow et al., "Adaptive Signal Processing"; Prentice Hall, 1985 Book, FK5102.5w537, pp, 128–131.

*Primary Examiner*—Nelson Moskowitz
*Attorney, Agent, or Firm*—Flehr, Hohbach, Test, Albritton & Herbert

[57] ABSTRACT

An apparatus (10) for determining while drilling in the earth with a drill bit (12) the positions of seismic wave reflecting geologic formations (15, 17) has seismic wave sensors (A, B) positioned in the earth near its surface (42). The sensors (A, B) are disposed at known positions with respect to the borehole. The drill bit (12) generates the seismic waves. The sensors (A, B) receive the seismic waves both directly and by reflection from the geologic formations (15, 17). Adaptive filters (20, 26) are connected to each of the sensors (A, B). A summing circuit (34) receives outputs from the adaptive filters (20, 26). The converged impulse responses of the adaptive filters provide information about the amplitude of the reflected waves and their arrival times at the surface, thus allowing detection of the reflecting horizons and their location and physical characteristics.

4 Claims, 9 Drawing Sheets

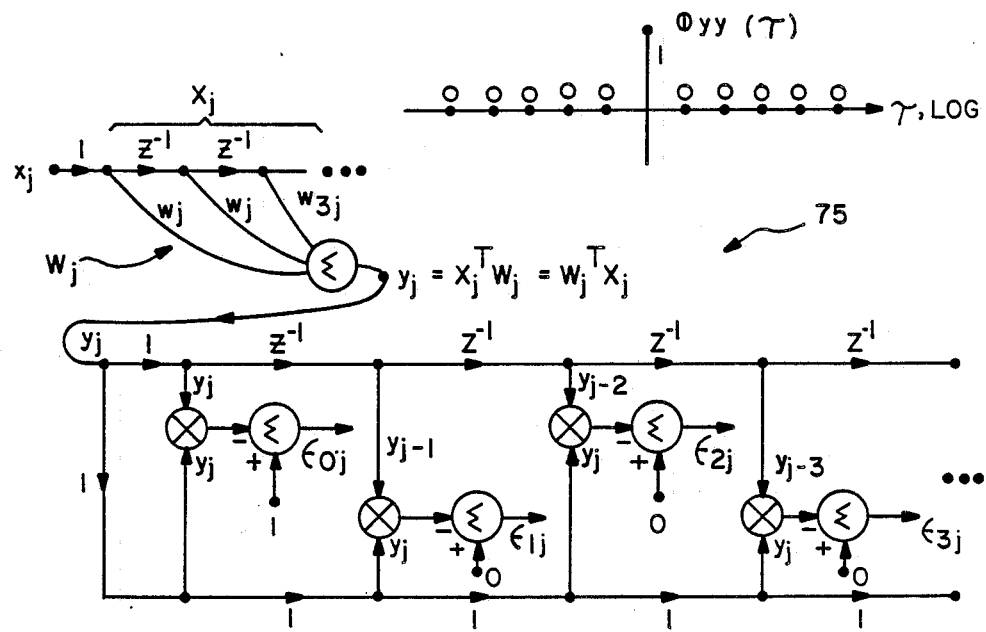
FIG. —6
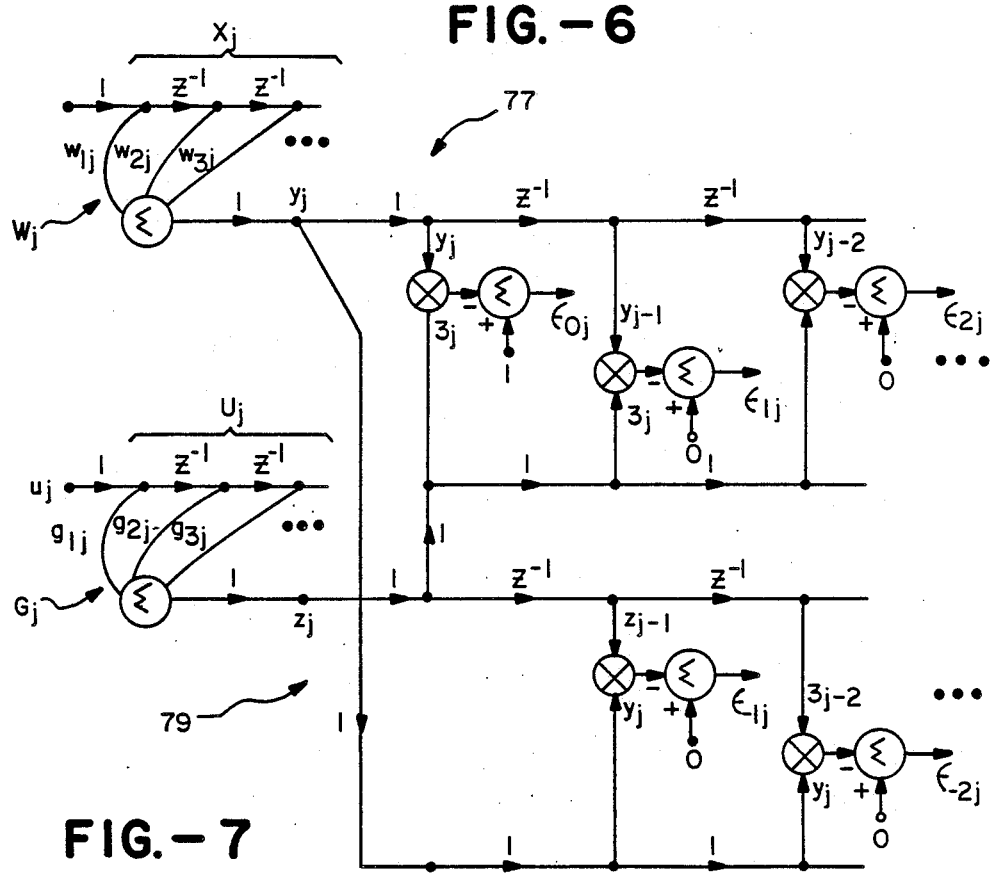
FIG. —7

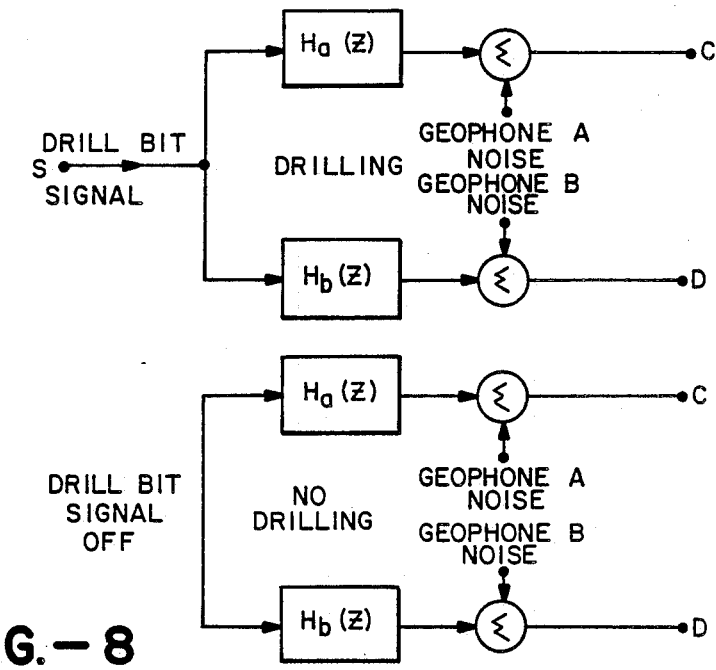
FIG.—8
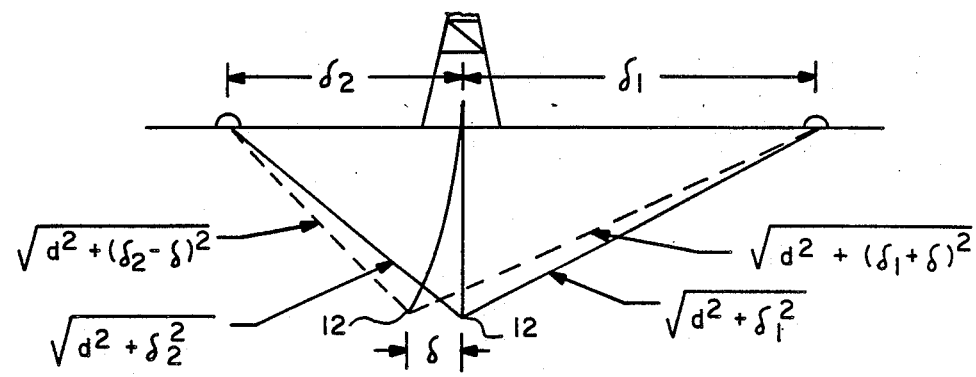
FIG.—9
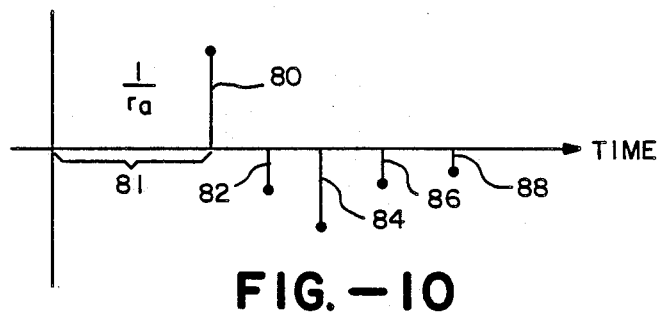
FIG.—10

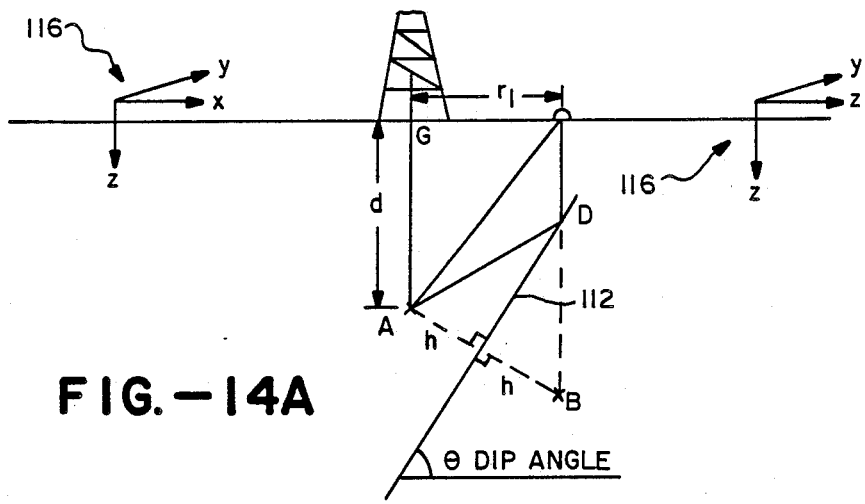
FIG.—14A
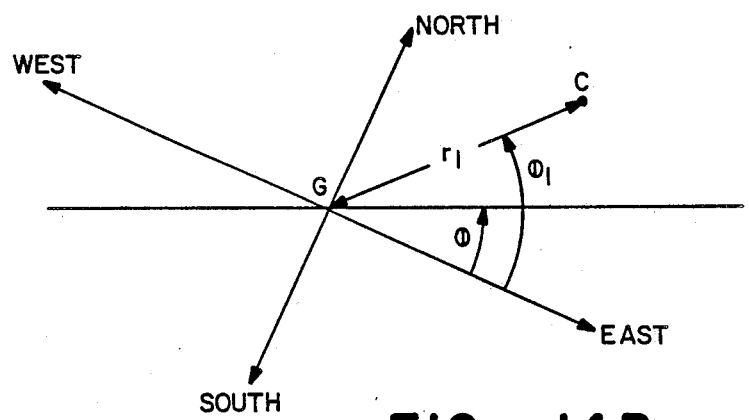
FIG.—14B
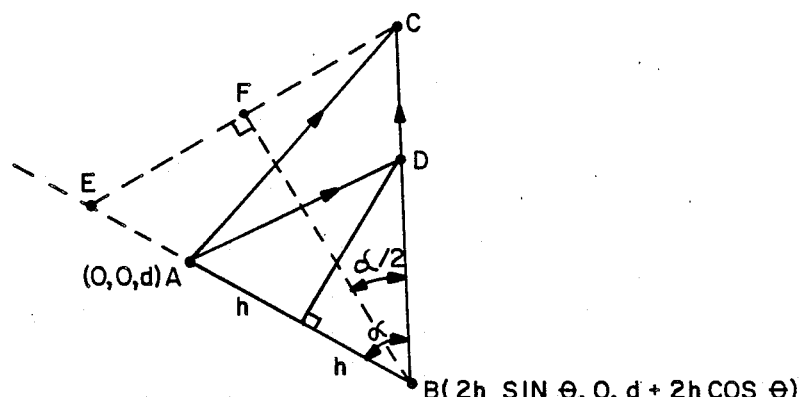
FIG.—15

SEISMIC PROCESSING AND IMAGING WITH A DRILL-BIT SOURCE

This is a division, of application Ser. No. 939,359 filed Dec. 8, 1986, now U.S. Pat. No. 4,849,945.

BACKGROUND OF THE INVENTION

1. Field of the Invention

This invention relates to an improved form of apparatus for determining while drilling in the earth with a drill bit the positions of seismic wave reflecting geologic formations in the earth. More particularly, it relates to such an apparatus which utilizes signal processing and imaging techniques to characterize such geologic formations more precisely.

2. Description of the Prior Art

The use of the drill bit as a seismic source while drilling in the earth is taught by Widrow in U.S. Pat. No. 4,363,112, issued Dec. 7, 1982 and U.S. Pat. No. 4,365,322, issued Dec. 21, 1982. Using this type of downhole source, it is possible to detect a reflecting layer in the earth which is shallower than the depth of the drill bit. Upward going seismic energy radiating directly from the bit is shadowed at the surface by the target reflector and is detected by an array of surface geophones. It is also possible to detect a reflecting layer in the earth which is deeper than the depth of the drill bit. Direct and reflected waves arrive at the surface and the presence of the reflector is manifested in an interference pattern which can be observed by an array of surface geophones. Also, as shown in the above referenced Widrow patents, spatial sampling of the surface seismic field by geophone arrays is important to the imaging of reflective targets.

SUMMARY OF THE INVENTION

Accordingly, it is an object of this invention to provide an apparatus and method for determining while drilling in the earth with a drill bit the positions of multiple seismic wave reflecting geologic formations in the earth in which differences in travel time of seismic waves generated by the drill bit are sensed and seismic wave signals are subjected to signal processing techniques that will give a better characterization of the geologic formations.

It is another object of the invention to provide such an apparatus and method in which imaging techniques are employed to characterize geologic formations more precisely.

It is still another object of the invention to provide such an apparatus and method which will allow the surface and edges of the geologic structures to be delineated, so that gas pools, faults, fractures, or stratigraphic layers can be detected and mapped, reflection coefficients can be measured, drill bit location can be determined, hardness of the rock being drilled can be determined, and condition of the drill bit can be ascertained.

The attainment of these and related objects may be achieved through use of the novel apparatus and method herein disclosed for determining while drilling in the earth with a drill bit the positions of seismic wave reflecting geologic formations in the earth. The purpose of the present invention is to teach an extension of the concept of the drill bit as a seismic source, showing means of processing geophone signals so that multiple targets in various locations and depths in the earth can be detected and imaged. Differences in travel time of the seismic radiation will be sensed, and this will be the means by which simultaneously arriving reflections from multiple targets can be distinguished and imaged.

An apparatus in accordance with the invention includes a plurality of seismic wave sensors positioned in the earth near the earth's surface at a plurality of known positions with respect to a borehole. The seismic wave sensors are adapted to receive the seismic waves generated by the drill bit which travel directly to the sensors and which are reflected by the geologic formations. A like plurality of adaptive filtering means are each connected to receive sensed signals from one of the plurality of seismic wave sensors. A summing means is connected to receive an output from each of the like plurality of adaptive filtering means. In one form of the apparatus, the like plurality of adaptive filtering means is configured and connected to minimize mean square error at an output of said summing means by balancing the outputs of each of said like plurality of adaptive filtering means. In another form of the apparatus, the like plurality of adaptive filtering means are configured and connected to optimize a crosscorrelation function between the sensed signals.

A method for determining while drilling in the earth with a drill bit the positions of seismic wave reflecting geologic formations in the earth in accordance with the invention, a plurality of seismic wave sensors is positioned in the earth near the surface thereof, at a plurality of known positions with respect to a borehole. Drilling is carried out with the drill bit in the borehole, the drill bit serving to generate the seismic waves. The seismic waves generated by the drill bit which travel directly to the sensors and which are reflected by the geologic formations are sensed. The signals sensed by the sensors are supplied to a like plurality of adaptive filtering means. An output from each of the like plurality of adaptive filtering means is summed. In one form of the method, mean square error at an output of the summing means is minimized by balancing the outputs of each of the like plurality of adaptive filtering means. In another form of the method, a crosscorrelation function between the sensed signals is optimized. In a third form of the method, the plurality of seismic wave sensors are selectively focused on the drill bit and on the earth proximate to the drill bit.

As a result of the signal processing and imaging techniques employed in the apparatus and method of this invention, much more precise and complete information is obtained about subterranean geologic formations than has hitherto been obtained with seismic techniques. Obtaining such information gives a significant improvement in drilling yield.

The attainment of the foregoing and related objects, advantages and features of the invention should be more apparent to those skilled in the art, after review of the following more detailed description of the invention, taken together with the drawings, in which:

BRIEF DESCRIPTION OF THE DRAWINGS

FIG. 6 is a block diagram of another portion of the seismic wave sensing apparatus of FIG. 5, useful for understanding one manner of operating the apparatus of FIG. 5.

FIG. 7 is a block diagram of a third portion of the seismic wave sensing apparatus of FIG. 5, useful for understanding another manner of operating the apparatus of FIG. 5.

FIG. 8 is a block diagram of part of the apparatus of FIG. 5 at two different stages of operation.

FIG. 9 is a schematic representation showing one manner of operating an apparatus in accordance with the invention.

FIG. 10 is a waveform diagram of signal outputs obtained with the system of FIG. 1, useful for understanding one form of signal processing in accordance with the invention.

FIGS. 14A and 14B are further side and plan schematic diagrams useful in connection with FIG. 13.

FIG. 15 is another schematic diagram useful in connection with FIGS. 13, 14A and 14B.

DETAILED DESCRIPTION OF THE INVENTION

Figure 1:
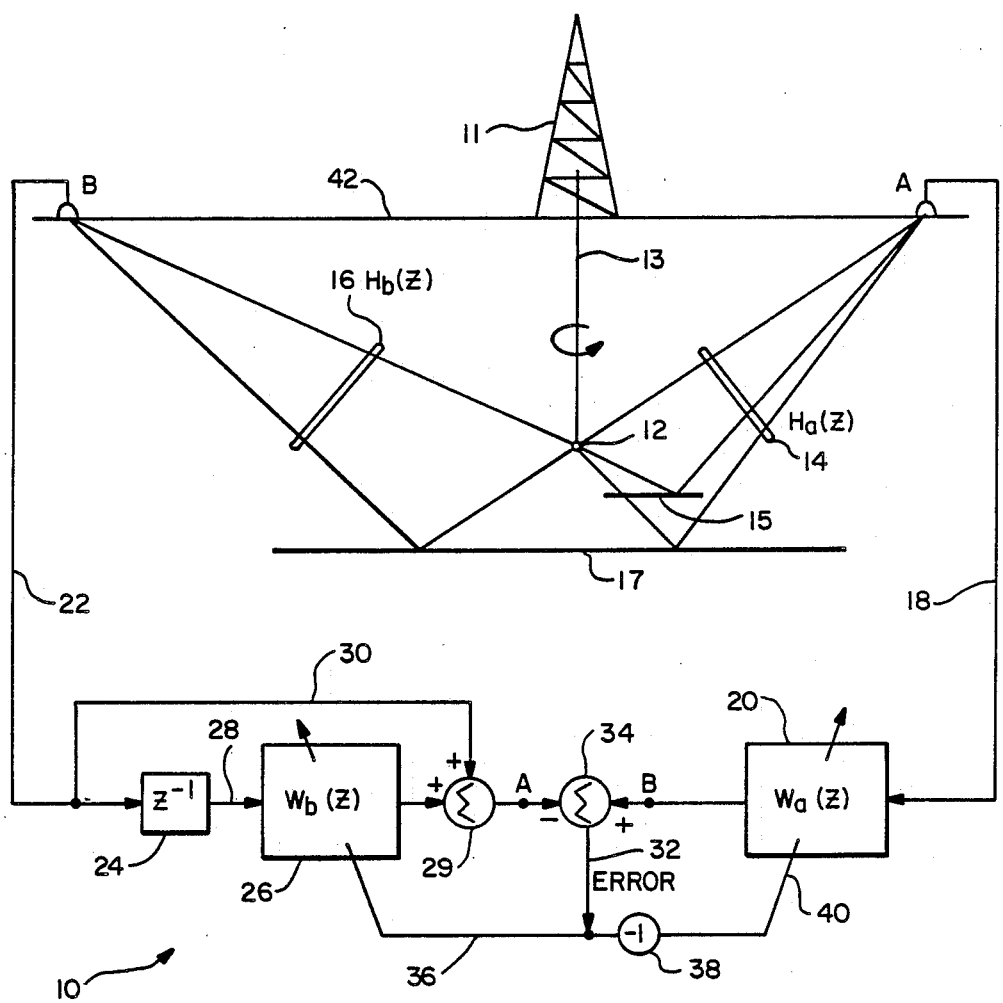
FIG. 1 is a block diagram of a seismic wave sensing and analysis apparatus in accordance with the invention.

Turning now to the drawings, more particularly to FIG. 1, there is shown a situation where multiple seismic reflectors are present in the earth in the vicinity of a drill bit while the drilling process is ongoing. With multiple reflecting layers, signals propagate from the drill bit to surface geophones via multipaths, i.e., by various direct and reflecting paths. The nature of the reflecting layers can be determined by signal processing techniques that permit accurate modeling of the unknown multipath structures. One way to do this is illustrated by the system 10 shown in FIG. 1.

In FIG. 1, signals are received simultaneously by geophone A and geophone B, having originated at the drill bit 12, connected to drilling rig 11 by drill stem 13. It should be understood that "geophone A" could be a single geophone or a subarray of geophones in close proximity wired together to produce a single signal. The same would be true for "geophone B." The signals could be at 3X shaft speed and its harmonics, and they could be modulated by the stroke frequency of the mudpump (if weight on the bit 12 varies periodically because of mud jet thrust), or signals could result at the mudpump frequency and its harmonics. In addition to these periodic components, broadband signals exist caused by the rock crushing action of the bit teeth. The signals from the bit 12 therefore contain harmonically spaced spectral lines (from the mudpump), harmonically spaced bandpass components (3X shaft speed and harmonics, from the tri-cone bit 12), and broadband components (from rock crushing). The net frequency range extends from several hertz to 100 Hz and perhaps higher.

Although the signal components produced by geophone A and geophone B both originate at the drill bit 12, these signals can differ substantially since the associated seismic waves arrive at the respective geophones having generally transmitted through two different multipaths 14 and 16, arriving by direct paths and reflected from reflecting horizons 15 and 17. Although these earth multipaths are continuous, not sampled, we can represent them by digital transfer functions $H_a(z)$ and $H_b(z)$ since the geophone signals will generally be sampled and processed digitally. $H_a(z)$ is the transfer function of multipath 14 and $H_b(z)$ is the transfer function of multipath 16.

In the system 10 of FIG. 1, the output of geophone A is supplied on line 18 and filtered by an adaptive filter 20 whose transfer function, after convergence, is $W_a(z)$. The output of geophone B is supplied on line 22 to delay element 24, and by delay element 24 to adaptive filter 26 on line 28. The output is filtered by $1+z^{-1}W_b(z)$, after adaptive filter 26 converges to $W_b(z)$ and summation takes place at 29. The term 1 results from the unit gain signal path on line 30 (any constant gain could have been chosen). The $z^{-1}$ factor comes from the unit delay of element 24. The adaptive filters 20 and 26 can be tapped delay lines, with adaptive algorithms suitably chosen to minimize the mean square of the error at the output 32 of summing circuit 34 (or some other even function of this error such as mean fourth, etc.). The LMS (least mean square) algorithm of Widrow and Hoff, as described in B. Widrow et al., "Adaptive Noise Cancelling Principles and Applications," Proc. IEEE, Vol. 63, No. 12, pp 1692–1716, December 1975 and B. Widrow and S. D. Stearns, Adaptive Signal Processing, Prentice-Hall, Inc., 1985, would be a natural choice. On the other hand, the adaptive filters 20 and 26 could be lattice filters, driven by the "exact least squares" adaptive algorithm of Morf and Lee, as described in D. T. Lee, M. Morf, and B. Friedlander, "Recursive Least-Squares Ladder Estimation Algorithms," IEEE Trans. Acoust. Speech Signal Process., Joint Special Issue on Adaptive Signal Processing, Vol. ASSP-29, No. 3, pp. 627–641. June 1981. In fact, any least squares adaptive algorithm applied to a suitable filter structure can be used to minimize an even function of the error signal at 32. The error signal at 32 is supplied on line 36 to adaptive filter 26, and to inverter 38 so that the negative error signal is supplied to adaptive filter 20 on line 40.

For present purposes, assume that the adaptive filters 20 and 26 of the system 10 self-adapt to minimize the mean square of the error. Adaptive techniques are required because the earth multipaths 14 and 16 are unknown. The objective is to create equality, a balance between the filtered outputs of both geophones at points A and B, like balancing a Wheatstone bridge, by making the error at 32 small. A balancing solution that would result in zero error would make the drill-bit signals equal by having $$H_a(z) \cdot W_a(z) = H_b(z)[1 + z^{-1} W_b(z)]$$

Incorporating the unit gain signal path 30 and the unit delay $z^{-1}$ 24 into the system of FIG. 1 prevented the trivial solution $$W_a(z) = 0, \ W_b(z) = 0 \qquad (2)$$

that the adaptive process would have brought without these constraints. Including these constraints is equivalent to forcing the first weight of the filter $[1 + z^{-1} W_b(z)]$ to be fixed at unit value. The remaining weights of $W_a(z)$ are unconstrained. The adaptive process is free to find weights for the filters 20 and 26 to minimize mean square error. Since the first weight, second weight, etc., could be zero, the filter $W_a(z)$ 20 is capable of being a delay followed by a transfer function. On the other hand, $[1 + z^{-1} W_b(z)]$ cannot have an initial delay. Therefore, to achieve balance, filter $W_a(z)$ 20 should be connected to the geophone output whose direct earth path from drill bit 12 to surface 42 has the shortest time delay. The filter $W_a(z)$ 20 can then assume any needed initial delay to achieve balance.

When the adaptive filters converge, a very useful solution of (1) results as $$W_a(z) = cH_b(z) \text{ and } [1 + z^{-1} W_b(z)] = cH_a(z), \qquad (3)$$

where c is a constant.

With this solution, the earth multipath 14, transfer function $H_a(z)$, is obtainable (within a scale factor) from the converged transfer function $W_b(z)$, and the earth multipath 16 transfer function $H_b(z)$ is obtainable (within the same scale factor) from the converged solution $W_a(z)$. Our goal is to determine the two earth multipath 14 and 16 transfer functions $H_a(z)$ and $H_b(z)$, and by fourier transformation to obtain their corresponding impulse responses. Given the impulse responses and given the knowledge of the geometry, the bit location, the geophone locations, and seismic velocities in the earth, one can determine the stratigraphy and the depths and positions of the various seismic reflectors, such as 15 and 17. Reflecting layers 15 and 17 are the boundaries of succeeding rock layers having different acoustic impedances. Peaks in the impulse responses correspond to the reflecting layers 15 and 17.

Three factors can limit the realization of solution (3): (i) having assumed too many weights for $W_a(z)$ or $W_b(z)$ or both, (ii) having assumed too few weights in $W_a(z)$ and $W_b(z)$, and (iii) the effects of independent earth noise in the geophone outputs. We begin by assuming that earth noise effects are negligible. Treating the noise where this is not the case will be done below. We discuss next the factors that concern choice of numbers of weights in the adaptive filters.

Referring to the block diagram of FIG. 1 and to Eqs. (3), the desired solution for $W_a(z)$ and $W_b(z)$ is such that the impulse response of $W_a(z)$ is proportional to that of multipath $H_b(z)$ 16, while the impulse response $[1 = z^- H_b(z)]$ is proportional to that of multipath $H_a(z)$ 14. The proportionality constant is c in both cases. For sake of argument, let $W_a(z)$ and $W_b(z)$ be tapped delay lines (transversal filters) with adjustable weights. In order that close fitting be possible, in accord with Eqs. (3), it is essential that the entire adaptive process be done with a high digital sampling rate, so that each filter $W_a(z)$ and $W_b(z)$ would have the flexibility associated with a large number of weights. The problem is to fit the multipaths 14 and 16 as impulse responses 44, 46, 48 and 50, 52 sketched in FIGS. 2A and 2B, respectively. Working with a high sampling rate allows high resolution in time and this thereby allows close fitting of $H_a(z)$ and $H_b(z)$.

Suppose that the drilling signal were a very simple one. Let it be a single sine wave for sake of argument. If the adaptive filters 20 and 26 had large number of weights, then many combinations of the weights would lead to zero error or small error in the system 10 of FIG. 1. The sine wave signal components at points A and B would match each other in both phase and magnitude, and the system would be balanced. Since many solutions would be possible, the weights would be indeterminate and underconstrained.

Instead of having large numbers of weights in both filters 20 and 26, only two adjustable weights among them would be required to achieve balance with a sinusoidal signal. Thus only two "degrees of freedom" would be needed from one filter, from the other, or one each, in order to achieve balance with low or zero error. If the drilling signal were more complicated, the sum of two sine waves at different frequencies for example, then four degrees of freedom in the filters 20 and 26 would be required to achieve balance with low or zero error.

In general, at least two degrees of freedom in the adaptive filters 20 and 26 would be required to achieve low error for each frequency component contained in the signal. But achieving low error is not the ultimate objective; modeling the earth is the true objective. To do this properly, the weights must be "overconstrained," there being less degrees of freedom in the filters' weights than frequency components in the signal. Otherwise, the converged solutions $W_a(z)$ and $W_b(z)$ would be underconstrained and infinitely variable and would not be suitable for identification of the multipath $H_a(z)$ and $H_b(z)$. Proper modeling of these multipaths will occur when the filters 20 and 26 contain a large number of weights which are closely spaced in time, and of sufficient number to accurately represent the multipaths $H_a(z)$ 14 and $H_b(z)$ 16 through Eqs. (3). The drilling signal must contain more frequency components than half the number of weights, so that the weights would not be underconstrained. A most satisfactory signal would be a random wideband drilling signal.

Modeling the multipath structure of an irregular earth would typically result in impulse responses for filters 20 and 26 being sparse and irregular. This form of impulse response would occur naturally when mean square error is minimized by adaption. Most of the weights would take zero values. A small number of weights at the proper time taps would take nonzero values.

Figure 2A:
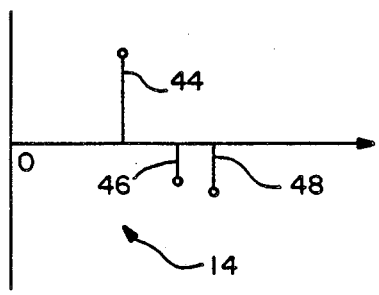
FIGS. 2A and 2B are waveform diagrams of signal outputs obtained with the apparatus of FIG. 1.
Figure 2B:
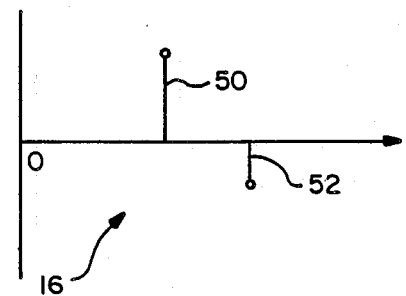

How many weights to use in $W_a(z)$ and $W_b(z)$ is not easy to determine. Some initial assumptions about the complexity of the stratigraphy will need to be made to get an initial guess. Start out with less weights than one would think to use, find the best solution, note the minimum mean square error. Add another weight in one of the filters and re-optimize. Find the new minimum mean square error and if it is significantly lower, keep this new weight and try to determine if the minimum mean square error could be further significantly lowered by adding another weight to one filter or the other. Add weights one at a time until no further improvement in minimum mean square error is possible, then use Eqs. (3) to determine $H_a(z)$ and $H_b(z)$. Fourier transforming will yield the corresponding impulse responses 44–52, as shown in FIGS. 2A and 2B, from which one can obtain the various arrival delays and reflection coefficients. The first pulse 44 or 50 in each of the impulse responses corresponds to the earliest arrival, the direct arrival. Subsequent pulses 46, 48 and 52 correspond to arrivals from reflection paths. The differences in arrival times correspond to the differences in travel times among the various reflection paths. The ratio of pulse amplitudes to the corresponding first arrival pulse gives an approximate measure of reflection coefficient if the reflection horizons 15 and 17 are large structures and the radiation from the drill bit 12 is uniform in all directions.

In summary, the two adaptive filters 20 and 26, adapted to balance their outputs by minimizing mean square error, yield transfer functions upon convergence from which the multipath impulse responses 44–52 from the drill bit 12 to surface geophones A and B can be obtained. The impulse responses 44–52 contain pulses 44 and 50 corresponding to direct ray paths and impulses 46, 48 and 52 corresponding to reflected ray paths. The timing of these pulses 44–52 gives relative travel times along the direct and the reflected paths, and the pulse amplitudes give relative reflection coefficients. Knowledge of the travel times, ray geometry and seismic velocity allows calculation of depths of the reflecting horizons.

MULTIPATH MODELING IN THE PRESENCE OF NOISE

The same analysis as in FIGS. 1 and 2 can be carried out in the presence of white earth noise present in the geophone outputs by minimizing mean square error using the leaky LMS algorithm to prevent biasing of the Wiener solutions by the additive earth noise. This is explained below in connection with FIGS. 3 and 4.

Noise in the earth will bias the converged solutions for the adaptive filters $W_a(z)$ and $W_b(z)$. Biased solutions may prevent good modeling of the multipaths $H_a(z)$ 14 and $H_b(z)$ 16 in accord with (3). Several methods for dealing with earth noise are hereby discussed.

White Earth Noise

By modifying the least squares adaptive algorithm for finding $W_a(z)$ and $W_b(z)$, it is possible to alleviate the effects of random white earth noise upon the multipath modeling process. The LMS algorithm is the easiest one to modify to achieve this objective.

How to adapt the weights of a conventional adaptive tapped delay line using the LMS algorithm is explained in detail in many places. One such reference is B. Widrow et al., "Adaptive Noise Cancelling: Principles and Applications," Proc. IEEE, Vol. 63, No. 12, pp. 1692–1716, December 1975.

Using the same notation as in this reference, the LMS algorithm for adapting the weights is $$W_{j+1} = W_j + 2\mu\epsilon_j X_j, \tag{4}$$

where $$\epsilon_j = d_j - y_j. \tag{5}$$

The discrete time index is j, $x_j$ is the filter input signal, and $y_j$ is the output signal. The input signal vector is $$x_j^T = [x_j, x_{j-1}, x_{j-2}, \ldots, x_{j-n+1}] \tag{6}$$

The weight vector at the $j^{th}$ instant is $$w_j^T = [w_{1j}, w_{2j}, \ldots, w_{nj}]. \tag{7}$$

The desired response input is $d_j$. The error is $e_j$. When choosing $\mu$ within the stable range, the mean value of the weight vector converges on the Wiener solution, the best linear least squares solution $$E[W_j]_{j \to \infty} = R^{-1}P, \text{ where} \tag{8}$$

$$R = E \begin{bmatrix} x_j x_j & x_{j-1}x_j & x_{j-2}x_j & \cdots \\ x_j x_{j-1} & x_{j-1}x_{j-1} & x_{j-2}x_{j-1} & \cdots \\ \vdots & & & \end{bmatrix} \tag{9}$$

$$P^T = E[x_j d_j \cdot x_{j-1}d_j \cdot x_{j-2}d_j \cdots x_{j-n+1}d_j]. \tag{10}$$

The symbol E[·] means take expected value. All of this is all well known in the adaptive filtering art.

Figure 3:
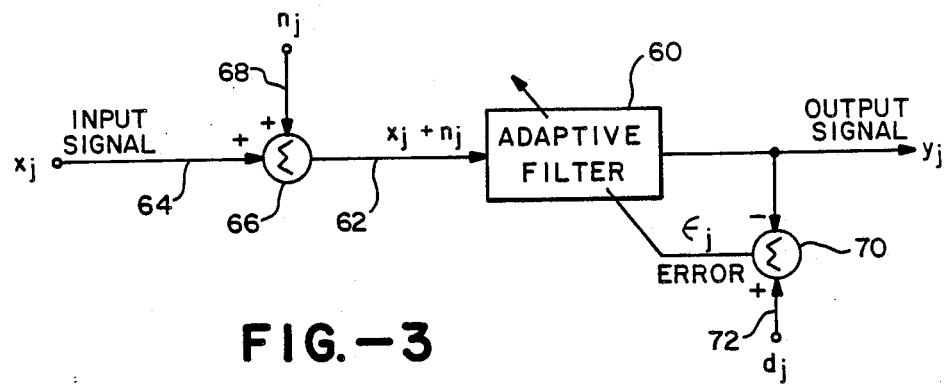
FIG. 3 is a block diagram of a portion of the seismic wave sensing apparatus of FIG. 1, useful for understanding operation of the invention.

Consider the case of the adaptive filter 60 of FIG. 3 having an input on line 62 consisting of signal $x_j$, plus white noise $n_j$. The signal $x_j$ is correlated with the desired response $d_j$, supplied to summing circuit 70 on line 72. The error $e_j$, the difference between $d_j$ and the filter output $y_j$, is minimized in the least squares sense by the adaptive filter. The additive noise $n_j$ is not correlated with $x_j$ or $d_j$. The expected value of the converged weight vector will be, in accord with Wiener filter theory, $$E[W_j]_{j \to \infty} = [R + \sigma^2 I]^{-1}P. \tag{11}$$

The noise $n_j$ is white with power $\sigma^2$. The Wiener solution (11) is biased from the Wiener solution (8) because of the additive input noise. To undo the effect of the noise, a modified form of the LMS algorithm will be used, called the "leaky" LMS algorithm. The LMS algorithm given by (4) and (5) can be modified as follows:

$$W_{j+1} = \gamma W_j + 2\mu\epsilon_j X_j \tag{12}$$

where $$\epsilon_j = d_j - y_j \tag{13}$$

as before, $$Y_j = X_j^T W_j = W_j^T X_j. \tag{14}$$

The parameter $\gamma$ is generally made less than one, and is thus a leak factor. With no input, $X_j = 0$, the weights will decay geometrically to zero, i.e., leak away. With $\gamma$ greater than 1, the weights will blow up geometrically even with $X_j = 0$. The value of $\gamma$ as well as the value of $\mu$ and the power of the input $X_j$ all will have effect on stability of (12), (13).

It is easy to show that when the weights are adapted in accord with (12) and (13), the expected value of the converged solution is $$E[W_j]_{j\to\infty} = \left[R + \frac{1-\gamma}{2\mu} I\right]^{-1} P. \tag{15}$$

This solution is also biased from solution (8), but the bias is controllable by choice of $\gamma$. Making $\gamma=1$ yields the original Wiener solution (8), as expected.

When the adaptive filter input consists of $x_j$ plus noise $n_j$ as before, and if the adaptive filter is adapted by the leaky LMS algorithm (12), (13), the expected value of the converged weight vector will be $$E[W_j]_{j\to\infty} = \left[R + \sigma^2 I + \frac{1-\gamma}{2\mu} I\right]^{-1} P. \tag{16}$$

$\gamma$ can now be chosen to overcome the bias effect of the input noise. Let $\gamma$ be $$\gamma = 1 + 2\mu\sigma^2. \tag{17}$$

Choosing $\gamma$ in accord with (17) and choosing $\mu$ within a stable range, the weight vector will converge in the mean to the unbiased Wiener solution (8).

To choose $\gamma$, one needs to know the input noise power $\sigma^2$. This can be determined by measuring the input power with the signal $x_j$ turned off, i.e., during times when there is no drilling and the mudpump is shut off. Otherwise, $\gamma$ can be chosen experimentally by carefully adjusting it to maximize the sharpness of the impulse responses of $W_a(z)$ and $W_b(z)$. $\mu$ must be greater than zero for reasons of stability. $\gamma$ will therefore be greater than one. Both $\mu$ and $\gamma$ must be chosen to maintain stability.

The leaky LMS algorithm specified by Eqs. (12), (13), (14), and (17) can be used to adapt the weights of the two adaptive filters 20 and 26 of FIG. 1. The objective is to minimize the mean square error and achieve the same set of Wiener solutions that would have resulted if there were no earth noise. This simple approach works well when the earth noise is stationary and white.

When the earth noise is not white or nonstationary, a more powerful technique is needed to adjust the weights of $W_a(z)$, filter 20, and $W_b(z)$, filter 26, of FIG. 1.

Non-White or Nonstationary Earth Noise

Figure 4:
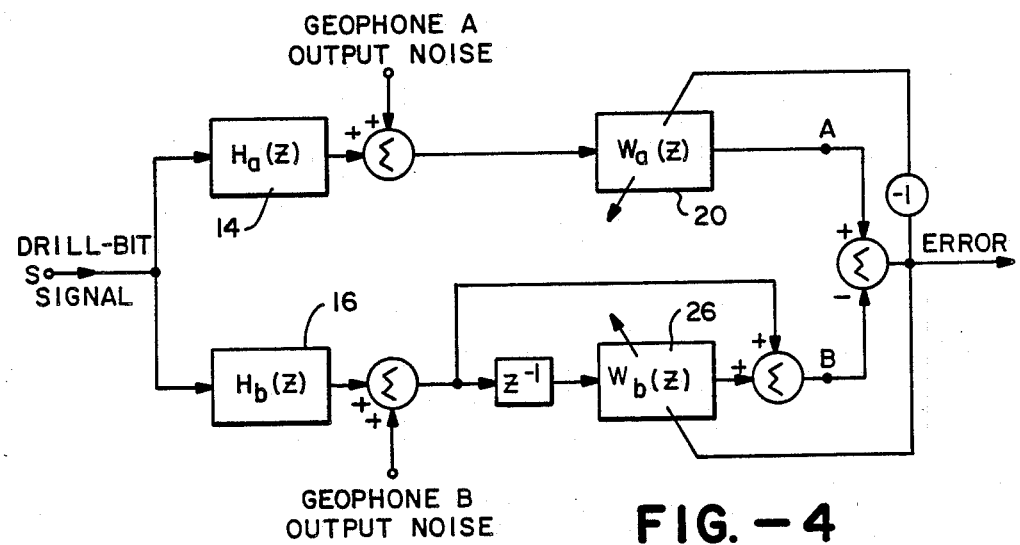
FIG. 4 is a block diagram of another portion of the seismic wave sensing apparatus of FIG. 1, useful for a further understanding of operation of the invention.
Figure 5:
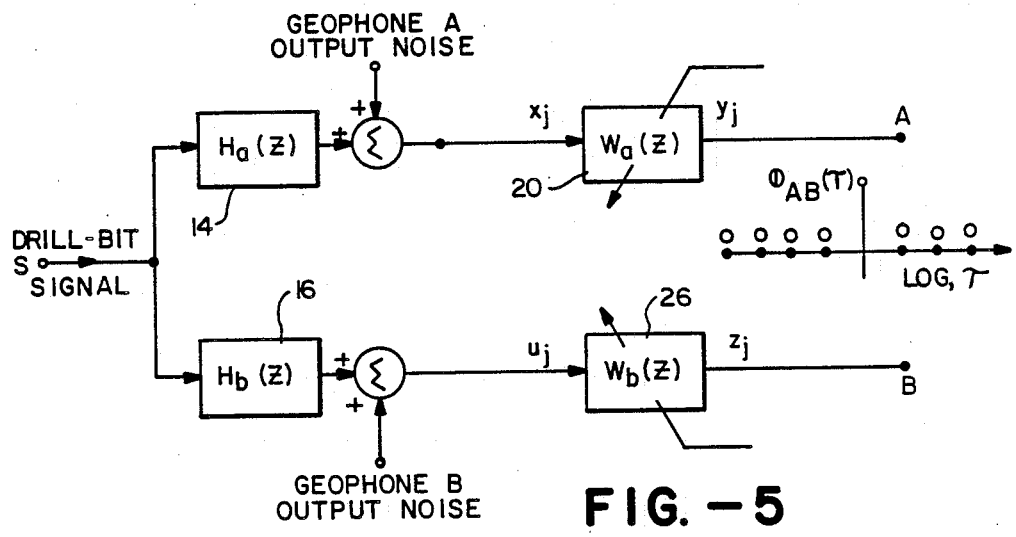
FIG. 5 is a block diagram of a portion of another seismic wave sensing apparatus in accordance with the invention.

The signal flow paths in the system 10 of FIG. 1 can be diagrammed simply as in FIG. 4. Points A and B of the system of FIG. 4 are indicated correspondingly to those in FIG. 1. Minimization of mean square error balances the bridge so that, if the geophone output noises (due to noise in the earth) are small, then Eqs. (3) will be satisfied and will allow an easy interpretation of the multipaths $H_a(z)$ 14 and $H_b(z)$ 16 in terms of the converged adaptive-filter 20 and 26 transfer functions $W_a(z)$ and $W_b(z)$. If the earth noises are not small, another approach not based on a least squares minimization of the usual type can be used for modeling the multipaths of interest, $H_a(z)$ 14 and $H_b(z)$ 16. The method is based on a crosscorrelation technique and is very different from the Wiener concept of minimization of mean square error. The earth noises need not be either white or stationary. They need only be uncorrelated with each other and uncorrelated with the drilling signal for the method to work.

Where the earth noise is not negligible, not stationary and white, the adaptive filters 20 and 26 are adjusted to cause cross-correlation of their outputs to be a delta function (FIG. 5). The adaptive filter transfer functions resulting give impulse responses of the earth multipaths $H_a(z)$ 14 and $H_b(z)$ 16. The procedure of FIG. 1 can be followed to obtain reflecting horizons and their positions. The basic idea is to adjust the weights of $W_a(z)$ and $W_b(z)$ in such a way that the crosscorrelation function between the waveforms at points A and B becomes a delta function. The idea is suggested in the diagram of FIG. 5. The weights of $W_a(z)$ and $W_b(z)$ will be adjusted so that the crosscorrelation function between waveforms A and B becomes $$\left\{ \begin{aligned} \phi_{AB}(\tau) &= 1, & \tau = 0 \\ &= 0, & \tau \neq 0 \end{aligned} \right\} \tag{18}$$

As such, the drill bit signal components at points A and B, which are correlated with each other, would be of the same waveshape, exactly proportional, and would be spectrally white. However, the total filtered outputs at points A and B, which include the geophone noises, would not generally be white. Note that adapting the weights of $W_a(z)$ and $W_b(z)$ to optimize $\phi_{AB}(\tau)$ would be a process not affected by the geophone earth noises since these noises are uncorrelated with each other and would not contribute to $\phi_{AB}(\tau)$. This is the real motivation for adapting to optimize $\phi_{AB}(\tau)$ as an alternative to minimizing mean square error. The adaptive process would not be affected by the geophone earth noises, and these noises would generally not be whitened at points A and B.

The crossspectrum of the signals at A and B in the diagram of FIG. 5 is the z-transform of $\phi_{AB}(\tau)$, designated as $\Phi_{AB}(z)$. The condition (18) will be achieved by adaption, so that $\Phi_{AB}(z)=1$. Let the spectrum of the drill bit signal at point S in the diagram of FIG. 5 be designated by $\Phi_{ss}(z)$. From filter theory, the crossspectrum from B to A and from A to B are respectively given by $$\Phi_{AB}(z) = 1 = \Phi_{ss}(z) \cdot H_a(z^{-1}) W_a(z^{-1}) \cdot H_b(z) W'_b(z)$$

$$\Phi_{BA}(z) = 1 = \Phi_{ss}(z) \cdot H_a(z) W_a(z) \cdot H_b(z^{-1}) W'_b(z^{-1}), \tag{19}$$

where $$W'_b(z) = 1 + z^{-1} W_b(z). \tag{19a}$$

The spectrum $\Phi_{ss}(z)$ can always be factored as $$\Phi_{ss}(z) = \Phi_{ss}^+(z) \cdot \Phi_{ss}^-(z). \tag{20}$$

All poles and all zeros of $\Phi_{ss}^+(z)$ are inside the unit circle in the complex z-plane. All poles and all zeros of $\Phi_{ss}^-(z)$ are outside the unit circle. It follows that $$\Phi_{ss}^+(z) = \Phi_{ss}^-(z^{-1}). \tag{21}$$

From Eqs. (19) we have $$H_a(z)W_a(z) \cdot H_b(z^{-1})W_b'(z^{-1}) = \frac{1}{\Phi_{ss}}. \quad (22)$$

The earth multipaths $H_a(z)$ 14 and $H_b(z)$ 16 are known to be stable, causal, and minimum phase. Therefore the poles and zeros of $H_a(z)$ all reside inside the unit circle while the poles and zeros of $H_b(z^{-1})$ all reside outside the unit circle. By adapting the $W_a(z)$ and $W_b(z)$ filters 20 and 26 to satisfy (18) and (19), and at the same time adapting them to be stable, causal, and minimum phase, the poles and zeros of $W_a(z)$ will all reside inside the unit circle and the poles and zeros of $W_b(z^{-1})$ will all reside outside the unit circle. As such, the solution of (22) is $$H_a(z)W_a(z) = \frac{1}{\Phi_{ss}^+(z)} \text{ and } H_b(z^{-1})W_b'(z^{-1}) = \frac{1}{\Phi_{ss}^-(z)} \quad (22a)$$

or $$H_a(z^{-1})W_a(z^{-1}) = \frac{1}{\Phi_{ss}^-(z)} \text{ and } H_b(z)W_b'(z) = \frac{1}{\Phi_{ss}^+(z)}.$$

Accordingly, $$H_a(z)W_a(z) = H_b(z)W_b'(z), \text{ or} \quad (23)$$

$$\frac{W_a(z)}{W_b'(z)} = \frac{H_b(z)}{H_a(z)}.$$

The above relations between the adaptive filter transfer functions and the earth transfer functions result from adaptation of the $W_a(z)$ and $W_b(z)$ filters 20 and 26 to satisfy the crosscorrelation condition (18). These relations are identical to condition (1) resulting from minimization of mean square error only when earth noises are zero or negligible. Relations (23) on the other hand are not affected by earth noises.

The ratio of the multipath transfer functions can be obtained from the ratio of the adaptive transfer functions $W_a(z)$ and $W_b(z)$ given by (23). Since the multipaths $H_a(z)$ 14 and $H_b(z)$ 16 have in fact zeros only, no poles, and the zeros correspond to the irregular layering of the earth near the drill bit, dividing out common factors $W_a(z)$ and $W_b(z)$ to their irreducible factors will allow evaluation of $H_a(z)$ and $H_b(z)$ to within a common scale factor.

$$W_a(z) = w_a(z) \cdot (\text{common factors})$$

$$W_b(z) = w_b'(z) \cdot (\text{common factors}) \quad (24)$$

Therefore, $$\frac{w_a(z)}{w_b'(z)} = \frac{H_b(z)}{H_a(z)}. \quad (25)$$

The irreducible factors $W_a(z)$ and $W_b(z)$ will correspond to impulse responses like that of the multipaths $H_a(z)$ 14 and $H_b(z)$ 16. Accordingly, $$w_a(z) = \alpha H_b(z)$$

$$w_b'(z) = \alpha H_a(z). \quad (26)$$

Equations (26) will allow one to obtain $H_a(z)$ and $H_b(z)$ from the adaptive solutions to within a common scale factor.

Taking inverse transforms of $\alpha H_b(z)$ and $\alpha H_a(z)$, one obtains the respective impulse responses. The earliest arrival of each of these multipaths will scale in accord with the energy spreading concept. Signal power from a point emitter radiating in a homogeneous medium drops with the inverse square of distance. Signal amplitude in turn drops with the first power of distance. Therefore, the first impulses of the respective impulse responses will scale relative to each other in the ratio of inverse distances from the drill bit to the respective receiving geophones. Checking this scaling will serve as a means of verifying the procedure, since the distances are known. Discrepancies could be due to earth attenuation or variations in geophone coupling.

Adaptive Whitening Filters

How to adapt $W_a(z)$ and $W_b(z)$ to achieve satisfaction of (18) is our next concern. A whole new concept of adaptive filtering is required. We begin with the development of a gradient algorithm for adaptation of a single channel whitening filter 75 as shown in FIG. 6. The filter 75 self adapts in accord with an iterative adaptive algorithm so that it filters its input having arbitrary autocorrelation function and creates an output signal that is white, having an autocorrelation function that is a delta function. For a given correlated ("colored") input signal, the problem is to filter it to produce an output having an autocorrelation function like this:

$$\left\{ \begin{array}{ll} \phi_{yy}(t) = 1, & \tau = 0 \\ = 0, & \tau \neq 0 \end{array} \right\} \quad (26a)$$

In accord with FIG. 6, the following errors can be defined:

$$\epsilon_{0j} = 1 - y_j^2 \quad (27)$$
$$\epsilon_{1j} = 0 - y_{j-1} \cdot y_j$$
$$\epsilon_{2j} = 0 - jy_{j-2} \cdot y_j$$
.
.
.

The objective is to produce an output $y_j$ having the above described autocorrelation function, corresponding to a white output. The weights $w_{1j}, w_{2j}, w_{3j}, \ldots$ must be chosen so that the expected values (the means) of all of the errors (27) will be zero simultaneously. To achieve this objective, a method is proposed that will minimize the mean square values of the above errors, more particularly minimize a linear combination of the mean square errors. This method will tend to keep the errors small, and will keep their means and variances small.

Minimizing mean square errors can be done with a gradient algorithm, similar to the LMS algorithm widely used in adaptive filtering of the conventional type.

Let the weight vector at the $j^{th}$ sampling instant be $$W_j = [w_{1j} \, w_{2j} \ldots ]^T. \quad (28)$$

Let the input signal vector to these weights be $$X_j = [x_j x_{j-1} x_{j-2} \ldots]^T. \tag{29}$$

The filtered output is $$y_j = X_j^T W_j = W_j^T X_j. \tag{30}$$

For the diagram of FIG. 6, and corresponding to (27), $$\epsilon_{0j} = 1 - W_j^T X_j X_j^T W_j. \tag{31}$$

Instead of working with the true gradient of $E[\epsilon_{0j}^2]$ with respect to the weight vector $W_j$, we work with an instantaneous gradient, the gradient of $\epsilon_{0j}^2$ with respect to $W_j$ which is $$\frac{\partial \epsilon_{0j}^2}{\partial W_j} = 2\epsilon_{0j} \frac{\partial \epsilon_{0j}}{\partial W_j} = \nabla_{\epsilon_{0j}}. \tag{32}$$

The partial derivative of $\epsilon_{0j}$ with respect to $W_j$ is obtained by differentiating (31). The result is $$\frac{\partial \epsilon_{0j}}{\partial W_j} = -(W_j^T X_j)(X_j) - (X_j)(X_j^T W_j) = -2y_j x_j. \tag{33}$$

Substituting (33) into (32) yields $$\nabla_{\epsilon_{0j}} = \frac{\partial \epsilon_{0j}^2}{\partial W_j} = -4\epsilon_{0j} y_j x_j. \tag{34}$$

A similar procedure can be followed to obtain the instantaneous gradient of $\epsilon_{1j}^2$.

$$\epsilon_{1j} = 0 - y_{j-1} v_j = 0 - W_{j-1}^T X_{j-1} X_j^T W_j. \tag{35}$$

Since the weights change slowly (although the signals $x_j$ change rapidly), $$W_{j+1} \approx W_j, \tag{36}$$

$$\frac{\partial \epsilon_{1j}}{\partial W_j} \approx -(W_{j-1}^T X_{j-1})(X_j) - (X_{j-1})(X_j^T W_j)$$
$$= -y_{j-1} x_j - y_j x_{j-1}$$

$$\nabla_{\epsilon_{1j}} = \frac{\partial \epsilon_j^2}{\partial W_j} = 2\epsilon_{1j} \frac{\partial \epsilon_{1j}}{\partial W_j} \approx -2\epsilon_{1j}(y_{j-1} x_j + y_j x_{j-1}). \tag{37}$$

Similarly, $$\nabla_{\epsilon_{2j}} = \frac{\partial \epsilon_{2j}^2}{\partial W_j} \approx -2 \epsilon_{2j}(y_{j-2} x_j + y_j x_{j-2}) \tag{38}$$

and so forth.

The gradient $\nabla_j$ is defined as a linear combination of the above gradients:

$$\nabla_j = (c_0 \nabla_{\epsilon_{0j}} + c_1 \nabla_{\epsilon_{1j}} + \ldots + c_l \nabla_{\epsilon_{lj}}) \left( \frac{1}{\sum_{m=0}^{l} c_m} \right). \tag{39}$$

The final algorithm for adapting the weights is $$W_{j+1} = W_j - \mu \nabla_j. \tag{40}$$

In Eq. (40), the parameter $\mu$ controls stability and rate of convergence.

The same methodology can be used to formulate a two-channel gradient algorithm for controlling the crosscorrelation between two signals, as required for the scheme of FIG. 5. FIG. 7 is a block diagram for the two-channel whitening algorithm. Shown are two adaptive filters 77 and 79 whose inputs have arbitrary autocorrelation functions and an arbitrary crosscorrelation function, and whose outputs have a crosscorrelation function that is a delta function. This dual channel system is an important part of the system shown in FIG. 5.

The desired crosscorrelation function is inserted as a set of constants for the determination of the crosscorrelation errors. In this case, the constants are . . . , 0,0,1,0,0, . . . in accord with (18). Any other crosscorrelation function could be obtained by inserting the corresponding set of constants.

Likewise, an arbitrary autocorrelation function could be obtained with the single-channel scheme of FIG. 5 by inserting the appropriate constants in place of 1,0,0,0, . . . .

With the system of FIG. 7, the weight vector $W_j$ and the weight vector $G_j$ will both be adapted to produce the required crosscorrelation function. The strategy is to adjust these weights to minimize a linear combination of the mean squares of the set of errors defined in FIG. 7. Once again, we will use a gradient algorithm using instantaneous gradients of the squared errors with respect to the weights:

$$w_j \nabla_{\epsilon_{0j}} = \frac{\partial \epsilon_{0j}^2}{\partial w_j} = -2\epsilon_{0j} z_j x_j \quad w_j \nabla_{\epsilon_{-1j}} = \frac{\partial \epsilon_{-1j}^2}{\partial w_j} = -2\epsilon_{-1j} z_j - 1 x_j$$

$$w_j \nabla_{\epsilon_{1j}} = \frac{\partial \epsilon_{1j}^2}{\partial w_j} = -2\epsilon_{1j} z_j x_{j-1} \quad w_j \nabla_{\epsilon_{-2j}} = \frac{\partial \epsilon_{-2j}^2}{\partial w_j} = -2\epsilon_{-2j} z_j - 2 x_j$$

$$G_j \nabla_{\epsilon_{0j}} = \frac{\partial \epsilon_{0j}^2}{\partial G_j} = -2\epsilon_{0j} y_j u_j \quad G_j \nabla_{\epsilon_{-1j}} = \frac{\epsilon_{-1j}}{\partial G_j} = -2\epsilon_{-1j} y_j u_{j-1}$$

$$G_j \nabla_{\epsilon_{1j}} = \frac{\partial \epsilon_{1j}^2}{\partial G_j} = -2\epsilon_{1j} y_{j-1} u_j \quad G_j \nabla_{\epsilon_{-2j}} = \frac{\partial \epsilon_{-2j}}{\partial G_j} = -2\epsilon_{-2j} y_j u_{j-2}$$

$$\tag{41}$$

. . .

These gradients were obtained in the manner of Eqs. (28)-(40). From them we obtain $$w_j \nabla_j = (c_0 w_j \nabla_{\epsilon_{0j}} + c_1 w_j \nabla_{\epsilon_{1j}} + \ldots c_{-1} w_j \nabla_{\epsilon_{-2j}} + \ldots) \left( \frac{1}{\Sigma c} \right) \tag{42}$$

-continued $$G_j \nabla_j = (d_0 G_j \nabla_{\epsilon 0 j} + d_1 G_j \nabla_{\epsilon 1 j} + \ldots + d_{-1} G_j \nabla_{\epsilon -1 j} + d_{-2} G_j \nabla_{\epsilon -2 j} + \ldots )\left(\frac{1}{\Sigma d}\right).$$

The algorithm for adapting the weights is therefore $$W_{j+1} = W_j - \mu w_j \nabla_j \quad G_{j+1} = G_j - \gamma G_j \nabla_j. \tag{43}$$

The algorithm (43) is directly applicable to the adaption of the weights $W_a(z)$ and $W_b(z)$ shown in the block diagram of FIG. 5. Upon obtaining $W_a(z)$ and $W_b(z)$, the multipath transfer functions $H_a(z)$ and $H_b(z)$ are obtained by making use of relations (19)–(26).

The purpose of the above described gradient algorithms for control of correlation functions is to obtain $W_a(z)/W_b(z)$, which gives $$\frac{W_a(z)}{W_b(z)} = \frac{H_b(z)}{H_a(z)}. \tag{23}$$

Then using relations (24), (25), and (26), one gets the desired multipath transfer functions $H_a(z)$ and $H_b(z)$ to within a scale factor.

It is important that both adaptive filters $W_a(z)$ 20 and $W_b(z)$ 26 are minimum phase. If some of their roots occur outside the unit circle, the corresponding factors should be replaced with factors having roots at conjugate positions in the z-plane. The resulting minimum phase transfer functions will satisfy condition (18) and should be used to calculate $H_a(z)$ and $H_b(z)$.

Stationary Earth Noises—A Simple Method

When earth noises are stationary over periods of time including drilling and no drilling, a simple algorithm can be used to directly find $H_a(z)/H_b(z)$. In this case, the transfer functions and impulse responses of the multipaths in the earth from drill bit to geophones at the surface can be obtained by using auto and crosscorrelations of the geophone signals while drilling and while not drilling. These transfer functions can be Fourier transformed to get the impulse responses from drill bit to surface geophones. Refer to the diagrams of FIG. 8 showing signals and noise while drilling and while not drilling. These diagrams are based on that of FIG. 5.

While drilling, the crosscorrelation between C and D will be nonzero. The z-transform of this crosscorrelation will be $$[\Phi_{CD}(z)]_{drilling} = \Phi_{ss}(z) \cdot H_b(z) \cdot H_a(z^{-1}) \tag{44}$$

The autocorrelation function at point C during drilling will be a sum of two components, that due to the drilling signal and that due to the uncorrelated additive noise. The autocorrelation function due to the drilling signal alone can be obtained by subtracting the point C autocorrelation function taken when there is no drilling from the point C autocorrelation function during drilling. The z-transform of this autocorrelation function difference is the spectrum of the drilling signal component at point C. This is $$\begin{pmatrix} \text{drilling signal spectrum} \\ \text{at point } C \end{pmatrix} = \Phi_{ss} \cdot H_a(z) \cdot H_a(z^{-1}) \tag{45}$$

$$= [\Phi_{cc}(z)]_{drilling} - [\Phi_{cc}(z)]_{no\ drilling}$$

Taking the ratio of (44) to (45) yields $$\frac{[\Phi_{CD}(z)]_{drilling}}{[\Phi_{cc}(z)]_{drilling} - [\Phi_{cc}(z)]_{no\ drilling}} = \tag{46}$$

$$\frac{\Phi_{ss}(z) \cdot H_b(z) \cdot H_a(z^{-1})}{\Phi_{ss}(z) \cdot H_a(z) \cdot H_a(z^{-1})} = \frac{H_b(z)}{H_a(z)}.$$

Since the numerator and denominator of the lefthand side of (46) are easily measured, we have obtained a simple method for getting the ratio of the multipath transfer functions that works when the earth noises are statistically stationary. Since $H_a(z)$ and $H_b(z)$ have zeros only, the numerator polynomial of (46) will yield $H_b(z)$ and the denominator polynomial of (46) will yield $H_a(z)$, the desired earth transfer functions, to within a common scale factor. It is assumed that $H_a(z)$ and $H_b(z)$ do not have common polynomial factors. This assumption will be met as long as the multipaths to geophones A and B are different.

Other Applications of the Drill-Bit Signal: Bit Location

Once one has the multipath impulse responses corresponding to $H_a(z)$ and $H_b(z)$, a great many things can be obtained. Among them are information on bit location, information on character of reflections and reflection coefficients of stratigraphic layers, information on drill bit source intensity and spectral content. An ability to detect reflections and measure reflection coefficients is of critical importance when studying the geology near the bore-hole. Bit location is important to know, especially if this location can be determined on a log-while-drill basis. There is no need to interrupt the drilling process to determine bit location by conventional "survey" techniques. The drill bit seismic intensity is related to the hardness of the rock and the weight on the bit. The spectral character of the drilling noise is indicative of the condition of the bit. Seismic time delays from one layer to the next in the earth can be obtained from the multipath impulse responses. This can be related to differences in the depth of the layer boundaries. A great deal of information is contained in the impulse responses of the multipaths.

The above described methods for finding $H_a(z)$ and $H_b(z)$ find them on a common time base. The impulse responses corresponding to $H_a(z)$ and $H_b(z)$ as shown in FIG. 2 correspond to the multipath structures 14 and 16 illustrated in the system 10 of FIG. 1. The first impulses in the impulse responses correspond to the direct (unreflected) ray paths from the drill bit 12 to the surface geophones A and B. The first pulse of the multipath $H_a(z)$ 14 occurs earlier than that of the multipath $H_b(z)$ 16 because the direct path of $H_a(z)$ is shorter than that of $H_b(z)$. The difference in time between these two leading pulses is the difference in travel time along the respective direct paths. Signal power received by the surface geophones A and B is inversely related to the square of the respective distances. The signal amplitudes are inversely related to these distances. The ratio of the amplitudes of the first pulses should therefore be in approximate inverse ratio to the distances. Checking this ratio will help in verifying the values of $H_a(z)$ and $H_b(z)$ derived from the data. The difference in time of the leading impulse-response pulses, being equal to the difference in travel times along the direct-ray paths, leads to a method for bit location as illustrated in FIG. 9. The direct arrival signals from the drill bit 12 to the geophones A and B on the surface can be detected, and differences in arrival times utilized to locate the drill bit 12. One of the above methods is used to get an impulse response, from which the direct arrival is obtained.

Regarding the diagram of FIG. 9, the distances $\delta_1$ and $\delta_2$ are known, as well as the depth d is known. If the hole is vertical, the difference in the path distances is $$\begin{pmatrix} \text{difference} \\ \text{in} \\ \text{distance} \end{pmatrix} = \sqrt{d^2 + \delta_1^2} - \sqrt{d^2 + \delta_2^2}. \quad (47)$$

Knowing the speed of propagation from sonic logs, check shot information, or surface seismic data, this difference in distance can be translated into difference in travel time. If the difference in travel time obtained after determination of $H_a(z)$ and $H_b(z)$ does not correspond to the difference in distance (47), then the hole is deviated. Referring to FIG. 9, for small deviation in downhole bit position, approximations can be made that are very useful in practice. The change in (47) due to deviation can be expressed as $$\begin{pmatrix} \text{deviation in} \\ \text{difference} \\ \text{in} \\ \text{distance} \end{pmatrix} = \sqrt{d^2 + (\delta_1 + \delta)^2} - \sqrt{d^2 + \delta_1^2} + \sqrt{d^2 + \delta_2^2} - \sqrt{d^2 + (\delta_2 - \delta)^2} \quad (48)$$

$$\approx \left[ \frac{\delta_1}{\sqrt{d^2 + \delta_1^2}} + \frac{\delta_2}{\sqrt{d^2 + \delta_2^2}} \right] \cdot \delta$$

A good way to practice this technique is to choose geophone locations so that $\delta_1$ and $\delta_2$ are equal. As such, (47) becomes $$\begin{pmatrix} \text{difference} \\ \text{in} \\ \text{distance} \end{pmatrix} = \sqrt{d^2 + \delta_1^2} - \sqrt{d^2 + \delta_1^2} = 0, \quad (49)$$

and (48) becomes, with a deviated hole, $$\begin{pmatrix} \text{deviation in} \\ \text{difference} \\ \text{in} \\ \text{distance} \end{pmatrix} \approx \left[ \frac{2\delta_1}{\sqrt{d^2 + \delta_1^2}} \right] \cdot \delta. \quad (50)$$

Thus, with $\delta_1 = \delta_2$, the difference in arrival times, if nonzero, can be related to the hole deviation $\delta$ as follows:

$$\delta = \left[ \sqrt{\frac{d^2 + \delta_1^2}{4\delta_1^2}} \right] \cdot \begin{pmatrix} \text{propagation} \\ \text{speed} \end{pmatrix} \cdot \begin{pmatrix} \text{arrival time} \\ \text{difference} \end{pmatrix}. \quad (51)$$

The speed of propagation of the seismic energy should be taken as the average seismic velocity from the drill bit 12 depth to the surface 42. The greatest accuracy will be obtained by making $\delta_1 = \delta_2$, although this is not necessary to make the process work. This method gives the hole deviation in a single plane. Deviation in an orthogonal plane through the vertical can be determined by making similar measurements with signals from another pair of geophones on an orthogonal line on the surface passing through the borehole.

Logging Rock Hardness

A rock hardness log can be obtained from the amplitude of the first arrival pulses 44 and 50 of the respective impulse responses shown in FIGS. 2A and 2B. The power spectra of the drilling signals obtained from the geophone outputs can be used to determine bit condition. Drop off of the high end of the spectrum indicates a worn bit. These features are explained below in connection with FIGS. 10 and 11.

The first pulses of the impulse responses corresponding to $H_a(z)$ and $H_b(z)$ are due to the respective direct ray paths from the drill bit to the surface geophones. If the known radial lengths of these direct paths are designated by $r_a$ and $r_b$, then the impulse responses of the two multipaths can be adjusted and scaled so that the amplitudes of the first impulses become $1/r_a$ and $1/r_b$ respectively. The idea is illustrated in FIG. 10.

Scaling the entire impulse response so that the first pulse 80 at travel time 81 has amplitude $1/r_a$ accounts for the effects of energy spreading. It does not, however, take into account effects of seismic attenuation due to energy dissipation. This effect can be readily included but is omitted here for simplicity. Impulses 82, 84, 86, and 88 in FIG. 10 correspond to reflected paths from reflecting stratigraphic layers in their order of proximity to the drill bit.

After the above scaling process, the transfer function of the multipath will be designated as $$[H_a(z)]_{scaled}$$

The spectrum and strength of the drilling signal at the source can now be determined. Consider the diagram of FIG. 11. Let the spectrum of the drill-bit signal at the source 90 be designated as $$[\Phi_{ss}(z)]_{source}$$

Figure 11:
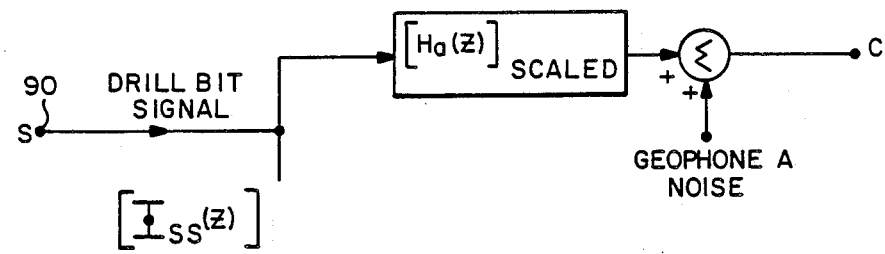
FIG. 11 is a block diagram of a portion of the apparatus of FIG. 1, useful in connection with FIG. 10.

The spectrum of the drilling signal at point C of FIG. 11 is given by Eq. (45). From this diagram, it is clear that $$[\Phi_{ss}(z)]_{source} \cdot [H_a(z)]_{scaled} \cdot [H_a(z^{-1})]_{scaled} = [\Phi_{cc}(z)]_{drilling} - [\Phi_{cc}(z)]_{no\ drilling}. \quad (52)$$

Accordingly, $$[\Phi_{ss}(z)]_{source} = \frac{[\Phi_{cc}(z)]_{drilling} - [\Phi_{cc}(z)]_{no\ drilling}}{[H_a(z)]_{scaled} \cdot [H_a(z^{-1})]_{scaled}}. \quad (53)$$

In like manner for point D, $$[\Phi_{ss}(z)]_{source} = \frac{[\Phi_{dd}(z)]_{drilling} - [\Phi_{dd}(z)]_{no\ drilling}}{[H_b(z)]_{scaled} \cdot [H_b(z^{-1})]_{scaled}}. \quad (54)$$

Both (53) and (54) can be used to calculate $[\Phi_{ss}(z)]_{source}$, should give the same result. This same result should also be obtained from the output signals of any number of surface subarrays.

The frequency spectrum of the drill bit signal can be obtained by letting $z^{-1} = e^{-j\omega}$, where $\omega$ is the radian frequency of interest. Therefore, the frequency spectrum is $$[\Phi_{ss}(e^{j\omega})]_{source}. \tag{55a}$$

The total energy of the seismic vibration due to drilling is $$\left\{ \int_0^{\text{half sampling freq.}} [\Phi_{ss}(e^{j\omega})]_{source} d\omega \right\} = \text{total drilling seismic energy.} \tag{55b}$$

Expressions (55a) and (55b) can be computed at any drilling depth, using one geophone or many geophones. A plot of these functions versus depth can be made after sufficient depth has been reached so that the weight on the bit is held essentially constant. Typically, once reaching about 3,000 feet of depth or so, the bit weight is held at about 40,000 pounds. The radiated drilling energy is proportional to the hardness of the rock being drilled, and to the weight on the bit. Plotting the radiated drilling energy and the energy spectrum versus depth gives a log of rock hardness, as long as the weight on the bit is approximately fixed.

Rock hardness logs have been described in the literature by J. Lutz, et al., "Instantaneous Logging Based on a Dynamic Theory of Drilling," Journal of Petroleum Technology, June, 1971, pp. 750-758. They measured vibration from the drill bit at the kelly with instruments attached to the swivel and the kelly.

They measured acceleration at the top of the drill string. They also measured instantaneous torque in the drill string. They call their result a SNAP log.

Our method of determining rock hardness and rock properties from drill bit vibrations has advantages over that of Lutz et al. We do not require instrumentation on the kelly. We only require two or possibly several geophone stations in the earth at least several thousand feet or so away from the drilling rig. Our radiated energy log is very similar to their SNAP log, and much easier to obtain.

The main difference in the approach to J. Lutz et al. and our approach is that we receive the drill bit vibration from the earth rather than from an accelerometer at the top of the kelly. We not only get a rock-hardness drilling log, but we also get a log (from the signal spectrum) of drill bit bounce off bottom. The drill bit bounce is a variable that the rig operator (the driller) wants to control to maximize a combination of penetration rate and bit life.

Information about the condition of the drill bit can also be obtained from the geophone signal spectrum. Broken teeth and jammed cone bearings have substantial impact on the signal spectral character. A healthy (new) bit produces broadband rock crushing noise at the cone teeth frequency. Since each cone has many teeth and since each cone revolves somewhat more rapidly than one revolution per revolution of the drill string, the teeth frequency is considerably higher than the cone frequency, which is 3× shaft rate plus harmonics. As long as the cones are revolving, broadband and periodic (not sharply tuned) energy higher than 20 Hz is present in full strength. The strength of these high frequency signal components drop off as the bit deteriorates. Thus, the signal spectrum can be used to determine the health of the bit.

Shear-Wave Drill Signals

Figure 12:
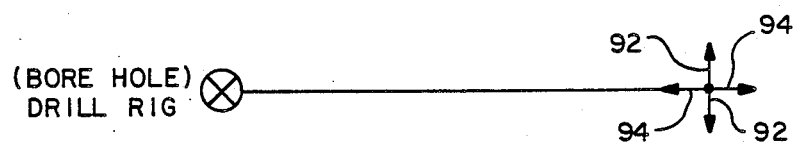
FIG. 12 is a schematic plan view of a portion of the apparatus in FIG. 1, useful for understanding another form of signal processing in accordance with the invention.

Shear waves created by torque on the bit are radiated by the bit and can be detected at the surface by using horizontal geophones. This radiation is processed like compressional wave radiation, and the same procedures as the above are followed. Differences in reflection coefficient with compressional waves and with shear waves give important information about rock properties. Three-axis geophones can be used at the various recording sites. Refer to FIG. 12. The vertical axis has been used mostly, and its output primarily relates to compressional waves generated by the bit on the hole bottom. The transverse horizontal axis geophone output 92 relates primarily to shear waves generated by the torque of the bit coupling to and acting on the earth. For the same frequencies, shear waves travel more slowly and therefore have shorter wavelengths. Higher resolution is the result. Also, reflection coefficients at the boundaries between shale and gas-saturated sand are lower than the compressional waves. The differences in these reflection coefficients give important information about rock properties.

The bouncing of the bit will show up in the transverse and radial horizontal geophone signals 92 and 94 as well as in the usual vertical signals. Stratigraphy with the drill bit signal is done the same way for the transverse and the radial components 92 and 94 as it is done for the vertical geophone component. The interpretations are similar, but the results differ in detail. Consider the impulse response sketched in FIG. 10. The first pulse 80 corresponds to the direct ray from geophone to the bit, the earliest quickest arrival path. The other pulses 82-84 correspond to longer reflected paths, as sketched in FIG. 1. Assuming that the radiation from the bit is omnidirectional and of uniform intensity in all directions, then the ratios of the amplitudes of these pulses to the amplitude of the first pulse correspond to the reflection coefficients for the corresponding reflection horizon after taking into account the energy spreading effects with longer path length and the energy loss if the ray path involves penetration of layers additional to the target layer (refer to FIG. 1). Thus, the reflection coefficients are obtained from the multipath impulse response and from knowledge of path geometry. The reflection coefficients will differ in interesting ways when comparing results from compressional waves with results from shear waves. Compression waves will be sensed with vertical geophones. Shear waves will be sensed with transverse horizontal geophones. (There can however be some wave mixing taking place at the earth surface.)

Three-Dimensional Mapping of Reflectors Using the Drill-Bit Signal

In doing stratigraphy, in locating major reflectors such as faults, fractures, or changes in rock type, one can make direct use of impulse responses such as $H_a(z)$ 14 and $H_b(z)$ 16 as diagrammed in FIG. 1. Using data taken from several surface geophone stations and at several depths, one can determine for a planar reflector its location, dip angle, dip direction, and even the seismic velocity at the drill bit depth. One can also use this technique to determine the boundaries of the reflector. Using the methods for finding impulse response of multipaths as in FIGS. 1-8 and FIG. 12, and knowing velocity of seismic waves in the earth, imaging of three dimensional formations in the earth can be done, taking into account the known geometry using the drill bit signal. How this is done is described next in connection with FIGS. 13, 14A, 14B and 15.

Figure 13:
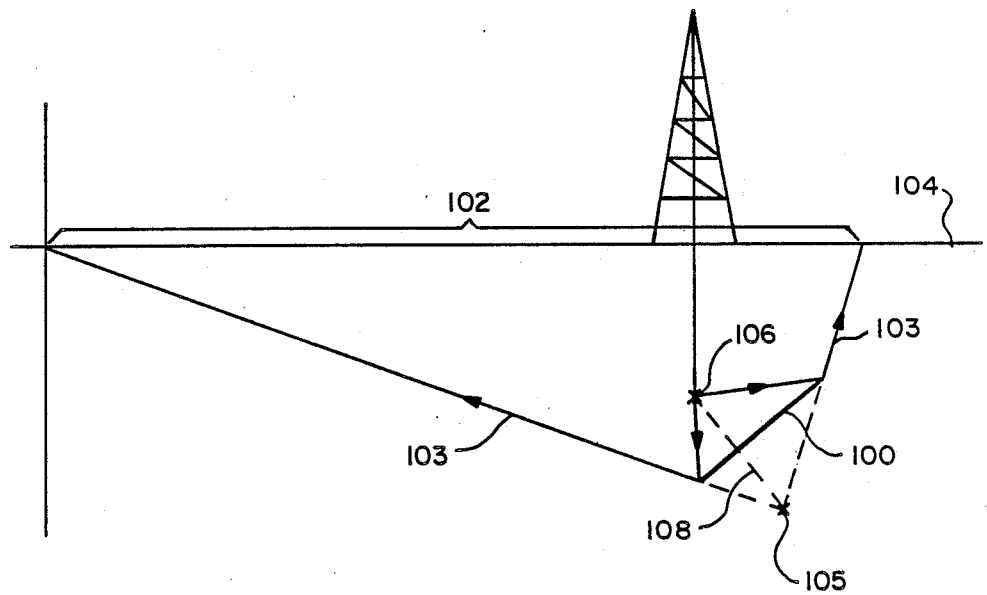
FIG. 13 is a schematic diagram useful for understanding still another form of signal processing in accordance with the invention.

Referring to FIG. 13, the reflecting formation 100 is not necessarily horizontal. The reflection zone 102 is the region of the earth surface 104 where reflected energy 103 is present This is easy to determine using the "image" concept. The image 105 of the drill bit 106 is located along a perpendicular line 108 from the drill bit 106 to the reflecting plane 100, at an equal distance, as illustrated in FIG. 13. The reflected energy 103 exists as if it originated at the image point 105. The area of the reflector 100 may be regarded as an open aperture allowing radiation from the image 105 to propagate to the earth surface 104. In FIG. 13, straight line rays 103 are assumed for simplicity. Diffraction effects are neglected.

Referring to FIGS. 14A and 14B, on an east-west, north-south grid 110, $\phi$ is defined as the angle of the direction of maximum dip of the reflecting plane 112, which is perpendicular to the page as shown. This angle is unknown and we would like to find it. The geophone station C is located a distance $r_1$ from the borehole G at an angle $\phi_1$ from due east. The direction of maximum dip is parallel to the plane of FIG. 14A. The dip angle is $\theta$. The distance from the drill bit 114 to the reflecting plane is h, and the distance from the reflecting plane to the drill bit image is h.

Referring to FIG. 14A, an X,Y,Z coordinate system 116 is shown. Let the following be the coordinates of various points shown in FIG. 14A:

point $G \rightarrow (0, 0\ 0)$
point $A \rightarrow (0, 0, d)$
point $B \rightarrow (2h\sin\theta, 0\ d + 2h\cos\theta)$ (56)

point $D \rightarrow$ (this is what we would like to find)
point $C \rightarrow (r_1\cos(\phi_1 - \phi), r_1\sin(\phi_1 - \phi), 0)$. (57)

Let the distance from point A to point B be designated as AB. The distance from A to C is $AC = \sqrt{d^2 - r_1^2}$. The distance from A to B is AB=2h, while $GC = r_1$.

In order to compute the coordinates of D where the reflected ray bounces from the reflecting plane, consider the diagram of FIG. 15.

On line BA, extend to point E so that BE=BC. Angle $\alpha$ can be found in the following way. The perpendicular bisector of EC bisects angle $\alpha$ at point B. We need to find the distance $\overline{FC}$. We can find the distance $\overline{EC}$ by first finding the coordinates of point E. First note that $$BC = \sqrt{[r_1\cos(\phi_1 - \phi) - 2h\sin\theta]^2 + [r_1\sin(\phi_1 - \phi)]^2 + [2h\cos\theta]^2}$$ (59)

The coordinates of point E are, therefore, point $E \rightarrow (- (\sin\theta)(BC - 2h), 0, d - (\cos\theta)(BC - 2h))$. (60)

∴ Distance $EC = \sqrt{[r_1\cos(\phi_1 - \phi) + (\sin\phi)(BC - 2h)]^2 + [r_1\sin(\phi_1 - \phi)]^2 + [d - (\cos\phi)(BC - 2h)]^2}$ (61)

∴ Distance $FC = \tfrac{1}{2}EC$. (62)

Now, $\sin \alpha/2 = FC/BC$, or $\alpha = 2 \arcsin \frac{FC}{BC}$. (63)

Distance $\overline{BD}$ can now be obtained as follows:

$$\cos \alpha = h/BD, \text{ so that } BC = \frac{h}{\cos \alpha}.$$ (64)

Knowing the coordinates of point B and C and knowing the distance $\overline{BD}$, the coordinates of point D are point $D \rightarrow ((2h\sin\theta) + \frac{BD}{BC} (r_1\cos(\phi_1 - \phi) - 2h\sin\phi),$ (65)

$\frac{BD}{BC} r_1\sin(\phi_1 - \phi), \left(1 - \frac{BD}{BC}\right)(d + 2h\cos\phi)\right).$ Because triangle ABD is isosceles,

AD=BD (66)

Refer now to the multipath impulse responses of FIGS. 2 and 10. The first impulse 44 or 80 corresponds to the direct ray. The second impulse 46 or 82 corresponds to a reflected ray. The difference in time between these pulses corresponds exactly to the difference in seismic travel times along these paths.

Referring now to the geometrical pictures of FIGS. 14 and 15 and to the impulse responses, $$\Delta t \triangleq \begin{pmatrix} \text{time between} \\ \text{first and} \\ \text{subsequent} \\ \text{pulse} \end{pmatrix} = \frac{\begin{pmatrix} \text{difference in} \\ \text{distance} \end{pmatrix}}{\begin{pmatrix} \text{rate of} \\ \text{speed} \end{pmatrix}} =$$ (67)

$$\frac{[AD + (BC - BD)] - [AC]}{c}.$$

The parameter c is the average seismic velocity.

The question is, how does one use these relations to find h, $\Phi$, $\theta$, and c? What one knows is $\alpha t$, $r_1$, and $\theta_1$ for geophone station C. Also known is the drill depth d. To obtain the four unknowns h, $\phi$, $\theta$, and c, one would need data from four geophone stations. One would need to know the corresponding $\Delta t$, $r_k$, and $\Phi_k$ for each geophone station. A closed form solution is not possible. An iterative numerical solution is all that is practical. Assume initial values of h, $\Phi$, $\theta$, and c. Using Eqs. (59), (61), (62), (63), (64), (66), and (67), check for consistency for the $\Delta t$ of the impulse response data from each of the four geophones. Systematically, iteratively vary the estimates of h, $\Phi$, $\theta$, and c until consistency is obtained. If the reflector is indeed planar, then the obtained values of h, $\Phi$, $\theta$, and c from the data of four geophones should be consistent with the data from additional geophones. Because the data is sometimes noisy, a best least squares fit can be used to resolve inconsistencies, once again assuming a planar reflector.

After having computed h, Φ, and θ, the coordinates of point D given by (65) can be obtained from relations (59), (61), (62), (63), and (64). The reflection coefficient of the reflected ray corresponds to the reflection coefficient of the reflector 112 at point D. If the reflection coefficient at point D is very small or essentially zero, then one identifies point D as beyond the edge or perimeter of the reflecting formation 112. Using the data from a large array of geophones obtained at many drilling depths, various points on the reflecting plane 112 can thus be identified as being within a highly reflecting region or outside this region. If the reflector 112 is a gas saturated sand reservoir, its boundaries can thus be delineated. If the reflector 112 is a fault, its boundaries can be delineated. If the reflector 112 is a fracture, its boundaries can be delineated. The technique can be used for general subsurface mapping.

Using multiple pulses of the impulse response (in FIG. 10), the same techniques can be used to delineate multiple reflecting layers. Refer to the example illustrated in FIG. 1.

3-D Superresolution Imaging

Using conventional time-delay-and-sum (TD+S) beamforming with an array of geophones, one can focus on the drill bit, the brightest point source (the "hot spot"). This hot spot can be used for focusing, adjusting time delays and gains for maximum output power of the array. Then one can use vernier delays and gains to focus elsewhere, as desired, to get signal from some other volume of the earth.

Figure 16:
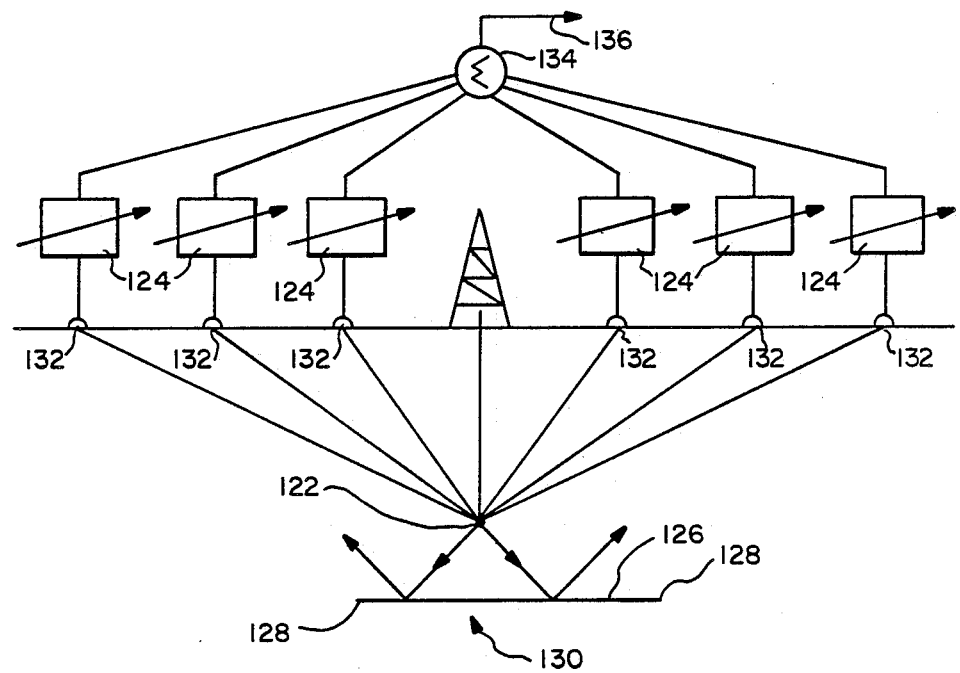
FIG. 16 is a block diagram of another seismic wave sensing and analysis apparatus in accordance with the invention.

Referring to FIG. 16, conventional beamforming techniques based on the principle of time delay and sum (TD+S) can be used with drilling signals to map subterranean structures in the vicinity of the drill bit 122. With even greater resolution, the same job can be done by adaptive beamforming (ABF) techniques. Both conventional and adaptive beamformers can be focused on the drill bit 122 initially. By adjusting the steering delays of delay elements 124, these beam formers 124 can be steered away from the drill bit to scan reflected signals from geologic structures in the vicinity of the drill bit 122. The surface 126 and edges 128 of reflecting structures 130 can be delineated by the scanning process, so that gas pools, faults, fractures, or stratigraphic layers are able to be detected and mapped. Reflection coefficients can be measured. The drill bit 122 location can be determined. The hardness of the rock being drilled is also able to be determined. The following is an explanation of how this is done.

A conventional time-delay-and-sum (TD+S) beamformer 120 is shown in FIG. 16. This must be a near field beamformer since the distance from one end of the geophone array 132 to the other (the aperture of the array 132) could be significant compared to the distance from the earth surface to the seismic source, the drill bit 122. The waves received by the array 132 are not plane waves, but are spherical waves instead. In fact, they are even more complicated by refraction caused by change in velocity with depth.

By adjusting the time delays as shown in FIG. 16, the TD+S beamformer 120 can be focused on the drillbit source 122 as follows. Start with initial delay settings at their nominal values, based on curved (refracted) rays corresponding to an assumed velocity profile versus depth. The assumed velocity profile is obtained from experience with adjacent already logged wells. The delays are set to cause all of the signal components to be summed coherently by summing circuit 134, in proper time registration at the beamformer output 136. Since the drill bit 122 is a "hot spot" (it is the strongest point source present), it is easy to focus on. Focusing is accomplished by making small changes in the bulk delays of adjustable delay elements 124 to maximize the power of the beamformer 120 output.

Figure 17:
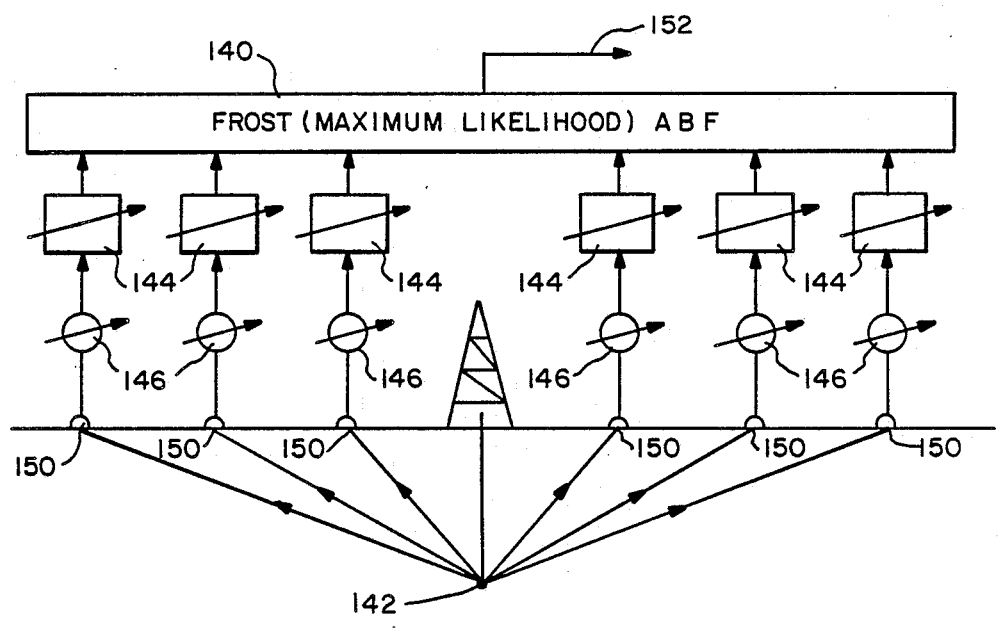
FIG. 17 is a block diagram of still another seismic wave sensing and analysis apparatus in accordance with the invention.

Sharper focusing can be done with an adaptive beamformer 140. Using an adaptive beamformer (ABF) in place of TD+S, one can focus more precisely on the drill bit hot spot, because of superresolution capability of the ABF. Refer to FIG. 17: The Frost maximum likelihood adaptive beamformer (ABF) 140 shown in FIG. 17 is as described in O. L. Frost, III, "An algorithm for linearly constrained adaptive array processing," Proc. IEEE, Vol. 60, No. 8, pp. 926–935, Aug., 1972. Other algorithms could be used in its stead, such as by Widrow, et al., and Griffiths: B. Widrow, et al., "Adaptive Antenna Systems," Proc. IEEE, Vol. 55, No. 12, pp. 1243–2159, Dec., 1967. L. J. Griffiths, "A simple adaptive algorithm for real-time processing in antenna arrays," Proc. IEEE, Vol. 57, No. 10, pp. 1696–1704, Oct. 1969. In addition to these, many others are reported in the literature that could be directly substituted. For simplicity of argument, let the Frost algorithm be chosen.

To focus in on the drill bit source 142, it is essential that the bulk delays of adjustable delay elements 144 be properly set and that the bulk gains of adjustable gain elements 146, shown in FIG. 17, also be properly set. The objective is to insure that the drill-bit signal components at the inputs 148 of the Frost processor 140 be identical in amplitude, amplitude, waveshape, and time registration. Otherwise the Frost processor 140 will try, as best possible in the least squares sense, to reject the signal from the drill bit 142. A good initial setting for the bulk delays is as determined by the nonadaptive TD+S processor 120 of FIG. 16. A good initial setting of the gains of elements 146 makes them directly proportional to the distance from the respective geophone station 150 to the drill bit, compensating for energy spreading.

Because of unknown irregularities in the earth structure, the initial values of delay and gain can generally be improved upon. Maximum output power at 52 is obtained when the delays and gains are set optimally. Let the gains and delays be changed slightly. After changing, the ABF 140 is readapted until convergence, then the new output power is noted. These gradual adjustments are made cyclically to maximize the output power of the converged ABF 140.

One must be careful in raising the gain values, since this can easily raise output power without improving the beamformer 140 focusing. It is best to fix the sum of the squares of the gain values, then subject to this constraint, vary the gains and vary the delays to maximize ABF 140 output power. The ABF 140 is much more sensitive to errors in gain and delay than the TD+S beamformer 120. With the ABF 140, the signal from the drill bit 142 will be pulled out if the gains and delays are not just right for focusing on the drill bit 142. The high resolution ("superresolution") of the ABF 140 compared to the TD+S 120 has been described by W. F. Gabriel in "Spectral Analysis and Adaptive Array Superresolution Techniques," Proc. IEEE, Vol. 68, No. 6, pp. 654–666, June, 1980.

When the ABF 140 in FIG. 17 is focused on the drill bit 142, the signal from this source goes through the entire system with no distortion and with a fixed amplification. Any signal components arriving from a point in the earth other than the drill-bit point will tend to be nulled. The Frost constraints keep the drill-bit signal arriving from the focal point from being nulled. The desired target signal is defined as the one arriving from the focal spot. It is accepted with fixed gain. Everything else is treated as interference and is rejected by the ABF 140 as best possible in the least squares sense. This is well known in the adaptive beamformer literature.

After focusing optimally on the drill bit 142, the bulk delays and bulk gains can be frozen. With a slight change in structure, the focal spot can now be steered away from the drill bit to explore the radiation from volumes of earth near the drill bit. Once focusing on the drill bit with the ABF, one can focus on a spot away from it with adjustment of vernier gains and delays. Once the ABF is focused away from the drill bit, it nulls the drill bit signal and receives the signal instead from the focal spot.

Precise focusing on the drill bit and thereafter precise focusing near the drill bit is very useful for bit location. Changes in vernier gains and delays required to focus on a first position of the bit and then a second position of the bit allow calculation of the change in bit position.

Precise focusing on the drill bit allows accurate measurement of its radiated seismic energy. This is valuable in determining hardness of rock being drilled.

Precise focusing on the image of the drill bit with respect to a given reflector allows accurate measurement of reflected energy from the given reflector, thereby enabling measurement of reflection coefficient.

Figure 18:
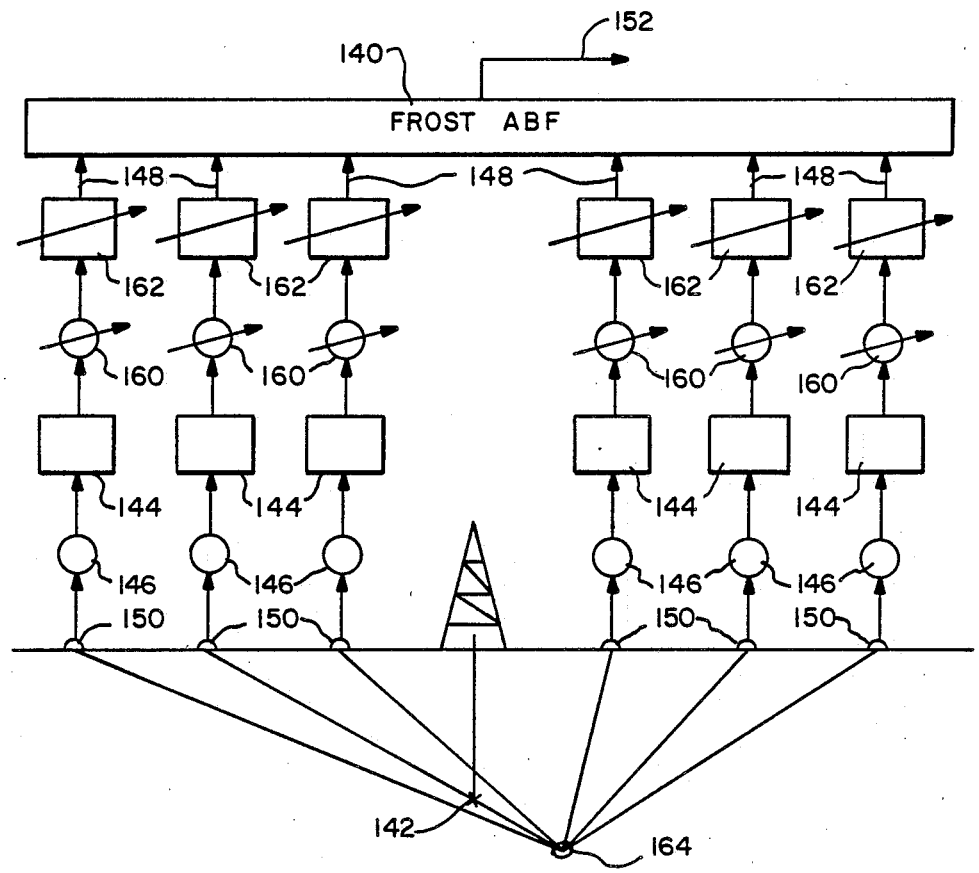
FIG. 18 is a block diagram of a further seismic wave sensing and analysis apparatus in accordance with the invention.

A modified version of the system of FIG. 17 is shown in FIG. 18. Vernier gains 160 and vernier delays 162 are included in the signal flow paths from the geophones 150 to the ABF inputs 148. For small deflection of the focal spot 164 from the drill bit 142 location, simple energy spreading is assumed in varying the gains, i.e., in setting the vernier gains 160 having fixed the bulk gains 146. Likewise, simple changes in time delay based on the average velocity of propagation and changes in known slant distance from geophones 150 to the drill bit 142 are used to determine the vernier delays 162.

Focusing away from the drill bit location is illustrated in FIG. 18. This is done by adjusting the vernier delays 162 and gains 160 after fixing the bulk delays 144 and gains 146. The bulk delays 144 and gains 146 were chosen adaptively to maximize the ABF 140 converged output power when focusing on the drill bit 142. The vernier gains 160 and delays 162 are not chosen adaptively, but are chosen to sustain the focus while moving the focal spot 164 to a point in the vicinity of the drill bit 142. These gain and delay changes are appropriate for small deflection and are based on simple assumptions about seismic propagation.

After the vernier gains 160 and time delays 162 are chosen to deviate the focal spot 164 from the drillbit 142 location, the adaptive process is allowed to reconverge. Since the drill-bit signal is no longer at the focal spot 164, the adaptive process eliminates it. It only accepts signal components emanating from the focal spot 164. By scanning the focal spot 164 slowly, allowing the ABF 140 to keep itself converged, it is possible to explore the radiated seismic field in the vicinity of the drill bit 142 without being overwhelmed or swamped by the radiation from the drill-bit 142.

Figure 19:
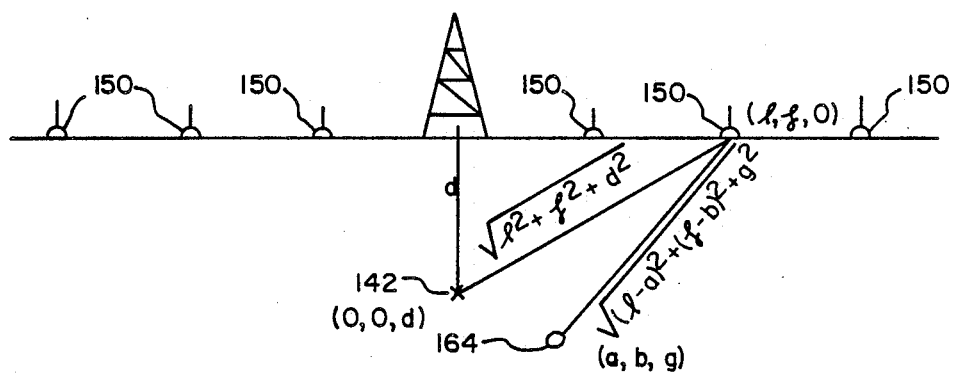
FIG. 19 is a schematic diagram useful for understanding operation of the apparatus of FIG. 18.

How the vernier gains 160 and delays 162 are chosen is shown in FIG. 19. The coordinates of the drill bit 142 are (0,0,d), that of the focal spot 164 are (a,b,g), and that of a selected geophone station 166 (e,f,0). The distance drill bit 142 to geophone station 166 is $\sqrt{e^2+f^2+d^2}$, and the distance from focal spot 164 to geophone 166 is $\sqrt{(e-a)^2+(f-b)^2+g^2}$. To move the focus from the drill bit 142 to the focal spot 164 indicated in FIG. 19, the vernier gain 160 and Vernier time delay 162 for the selected geophone location 166 are chosen as follows:

$$\left(\begin{array}{c}\text{vernier}\\ \text{gain}\end{array}\right) = \frac{\sqrt{(e-a)^2+(f-b)^2+g^2}}{\sqrt{e^2+f^2+d^2}} \quad \begin{array}{c}\text{compensates for}\\ \text{energy spreading}\end{array} \quad (68)$$

$$\left(\begin{array}{c}\text{vernier}\\ \text{delay}\end{array}\right) = \frac{\left(\begin{array}{c}\text{difference}\\ \text{in}\\ \text{distance}\end{array}\right)}{\left(\begin{array}{c}\text{seismic}\\ \text{velocity}\end{array}\right)} = \quad (69)$$

$$\frac{\sqrt{e^2+f^2+d^2} - \sqrt{(e-a)^2+(f-b)^2+g^2}}{c}.$$

In like manner, the other vernier gains 160 and delays 162 are chosen, based on the known locations of the surface geophones 150, of the drill bit 142, and of the selected focal spot 164. Note that vernier gains 160 could be greater or less than one, and that vernier delays 162 could be negative or positive. In case of negative vernier delay, this can be absorbed into the bulk delay to leave a net positive delay which is physically realizable. Note that the seismic velocity c is meant to be the average seismic velocity.

To sum up, this technique uses the accurate focusing possible when focusing on the drill bit 142 (the hot spot). For relatively small deflection from the drill-bit position, accurate focusing can be achieved even though the energy from the selected focal spot 164 may be small, much too small to focus on directly.

The adaptive beamforming scheme of FIGS. 17 and 18 can be used for bit location. Once the ABF 140 is first focused on the drill bit 142, at a depth of 3,000 feet for example, further drilling will take the bit 142 down to 3,500 feet. By keeping the same bulk delays 144 and gains 146 that were obtained by focusing on the bit at 3,000 feet, the vernier gains 160 and delays 162 can be used to refocus on the bit 142 after drilling to the lower depth. This amounts to scanning the focal spot 164, laterally and in depth, seeking maximum output signal power. The new position of the bit 142 relative to the old position of the bit 142 is thus established by using relations (68) and (69). This process can be repeated for greater depths. A conventional survey can be used from time to time to accurately locate the bit. In between these fixings, as often as one would like, the bit can be located relative to these fixed known positions. The number of conventional surveys required to track the hole can thus be greatly reduced.

Using the adaptive beamformer described above, the hardness of the rock being drilled can be determined. Also, reflection coefficients can be determined and seismic transit time from the drill-bit source to a selected reflector can be determined. One can focus on the image of the drill bit with respect to the selected reflector and thereby locate and identify this reflector.

The hardness of the rock is proportional to signal strength radiated directly from the drill bit 142, once the hole is deep enough, beyond 3,000 feet or so, so that the weight on the bit 142 is kept fairly constant, say 40,000 lbs. or so. Signal strength of the bit 142 as a direct radiator of seismic energy can be measured by focusing on the bit, keeping the sum of the squares of the normalized bulk gains 146 at unity. The normalized bulk gain is defined as the ratio of the gain to the distance from the drill bit 142 to the selected geophone. Normalization accounts for energy spreading. The signal output power of the ABF 140 is a direct measure of rock hardness and is a quantity that can be logged as the hole is drilled.

Reflection coefficients, in a relative sense, can be determined using the above described ABF schemes. By scanning the focal spot 164 at various lateral positions and at various depths to detect images of the drill-bit source 142, different reflecting layers can be sensed and different places along a given layer can be sensed. Reflected power can be measured. Account must be taken of the distance from the drill bit image to the geophone array to obtain relative values of reflection coefficient.

Crosscorrelating the outputs of two ABF's, one focused on the drill bit, the other focused on the image of the drill bit with respect to a given reflector, allows measurement of one-way travel time between the drill bit and its image. Knowing the acoustic velocity, one can then determine the distance between the bit and the given reflector.

Figure 20:
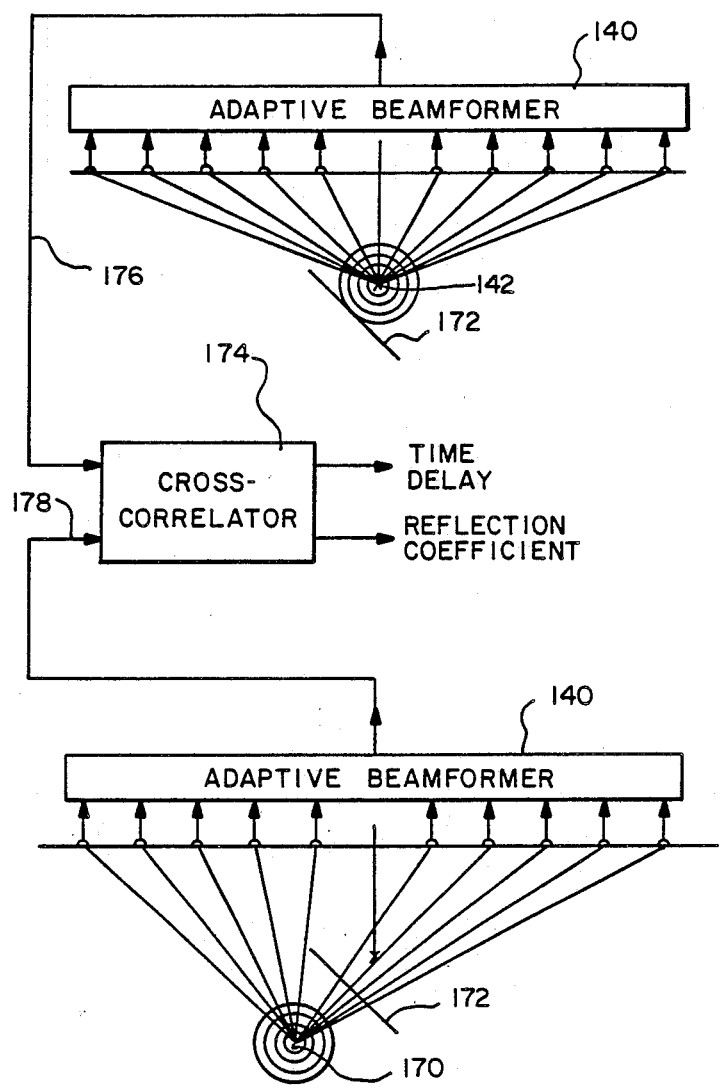
FIG. 20 is a block diagram of part of yet another wave sensing and analysis apparatus in accordance with the invention.

The two-way seismic travel time from the drill bit to a selected reflector can be obtained with the scheme of FIG. 20. Two adaptive beamformers 140 are used, one focused on the drill bit 142, the other focused at the drill bit image 170 for the selected reflector 172. The input signals for both beamformers could come from the same set of geophones. The outputs of the beamformers 140 are supplied to a crosscorrelator 174 on lines 176 and 178. Since each ABF 140 cleanly receives a signal from its focal spot, and since these signals originate at the drill bit 142, the crosscorrelation lag that produces the maximum crosscorrelation function magnitude corresponds to the transit time from the bit 142 to the image point 170. The same bulk delays and gains are used in both ABF's. The vernier delays and gains are used to steer the focal spot from the drill bit 142 to the actual reflector 172, in accord with relations (68) and (69). Knowing the seismic velocity in the vicinity of the drill bit 142, the distance from the drill bit 142 to the reflector 172 can be computed, and the reflector 172 can be located even more precisely by repeating the process at several different drill depths.

It should now be readily apparent to those skilled in the art that a novel seismic wave sensing and signal analysis apparatus and method capable of achieving the stated objects of the invention has been provided. The signal processing and imaging techniques used in this apparatus and process provide significantly more information about subterranean geologic formations than previous systems using seismic waves generated by a drill bit. As a result, better drilling decisions may be made to increase the proportion of wells that locate gas, oil or other resources.

It should further be apparent to those skilled in the art that various changes in form and detail of the invention as shown and described may be made. It is intended that such changes be included within the spirit and scope of the claims appended hereto.

What is claimed is:

1. Apparatus for determining while drilling in the earth with a drill bit the positions of seismic wave reflecting geologic formations in the earth, said drill bit serving to generate the seismic waves, which comprises at least one pair of seismic wave sensors positioned in the earth near the surface thereof, in at least one pair of known positions with respect to said borehole, said seismic waves generated by said drill bit which travel directly to said sensors and second seismic waves generated by said drill bit which are reflected by the geologic formations, at least one pair of adaptive filtering means each connected to receive sensed signals from one of said at least one pair of seismic wave sensors, means utilizing an adaptation algorithm to adapt said at least one pair of adaptive filtering means to optimize a crosscorrelation function between their outputs, impulse responses of said at least one pair of adaptive filtering means after convergence yielding arrival times and amplitudes of direct and reflected waves from said drill bit.

2. The apparatus for determining the positions of seismic wave reflecting geologic formations in accordance with claim 1 in which said at least one pair of adaptive filtering means is configured as adaptive filters whose inputs have arbitrary autocorrelation functions and an arbitrary crosscorrelation function, and whose outputs have a cross correlation function that is a delta function as a result of the adaptive process.

3. The apparatus for determining the positions of seismic wave reflecting geologic formations in accordance with claim 1 in which at least one of said at least one pair of seismic wave sensors is a geophone which detects seismic waves in at least one horizontal direction.

4. The apparatus for determining the positions of seismic wave reflecting geologic formations in accordance with claim 1 in which said apparatus is configured to provide a three-dimensional image of the seismic wave reflecting geologic formations.

* * * * *